July 29, 1958 B. L. HAVENS ET AL 2,845,538
SUPER HIGH FREQUENCY DIVIDERS
Filed Jan. 25, 1956 12 Sheets-Sheet 10
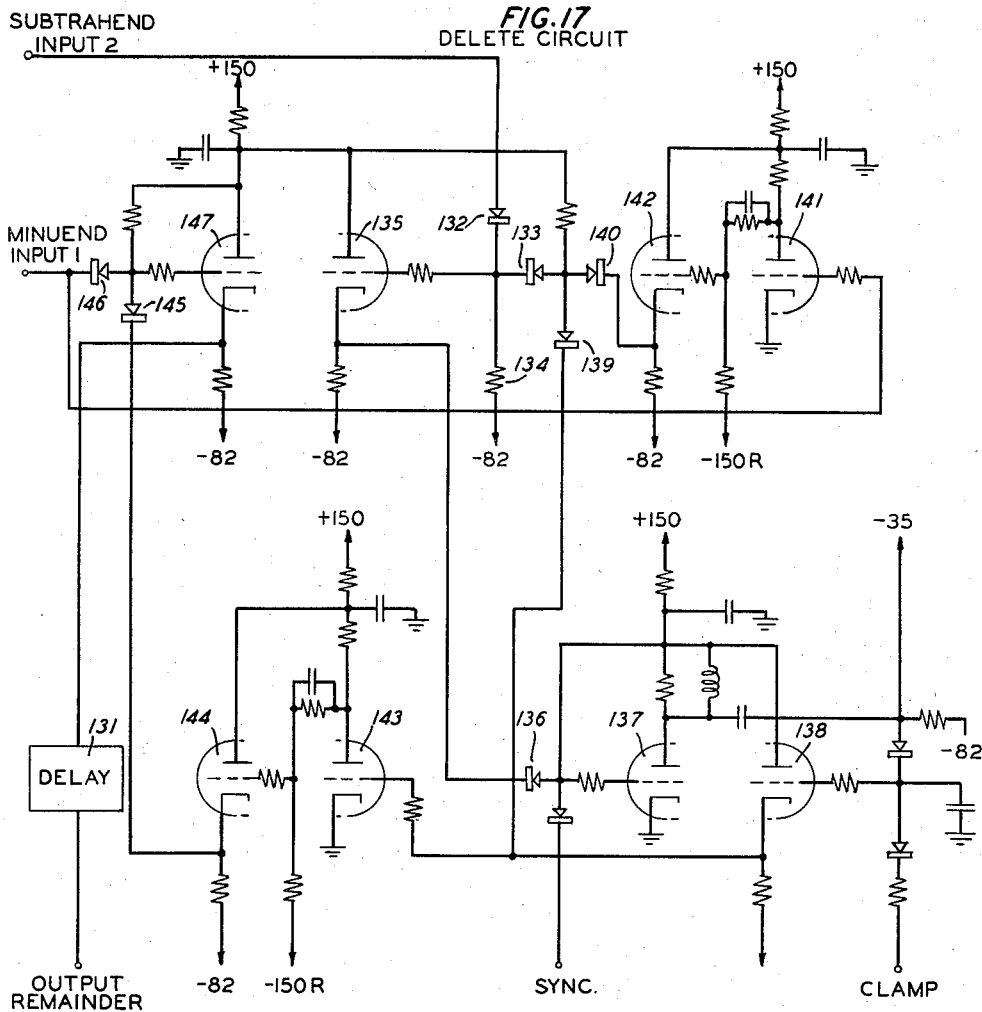
FIG. 17 DELETE CIRCUIT
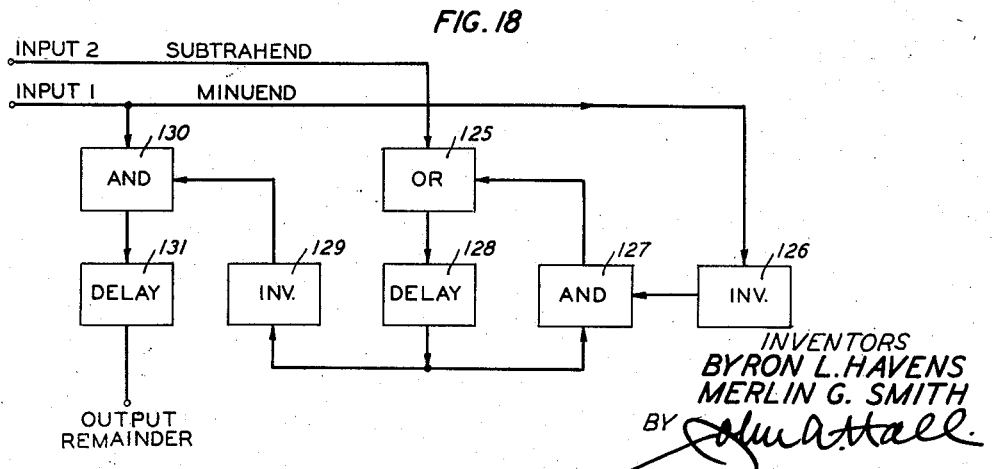
FIG. 18
INVENTORS
BYRON L. HAVENS
MERLIN G. SMITH
BY
ATTORNEY

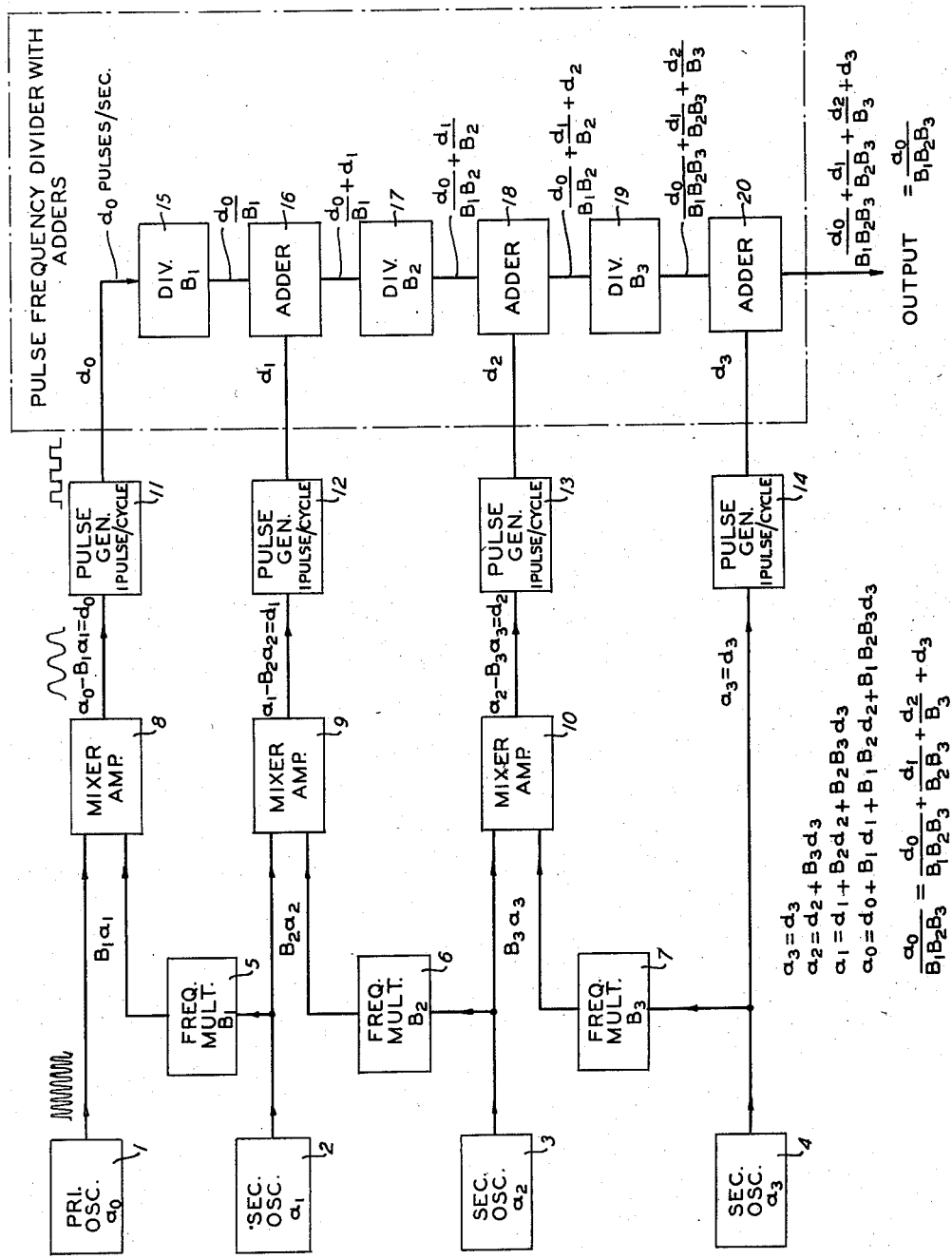
FIG. I
INVENTORS
BYRON L. HAVENS
MERLIN G. SMITH
BY John Attall
ATTORNEY

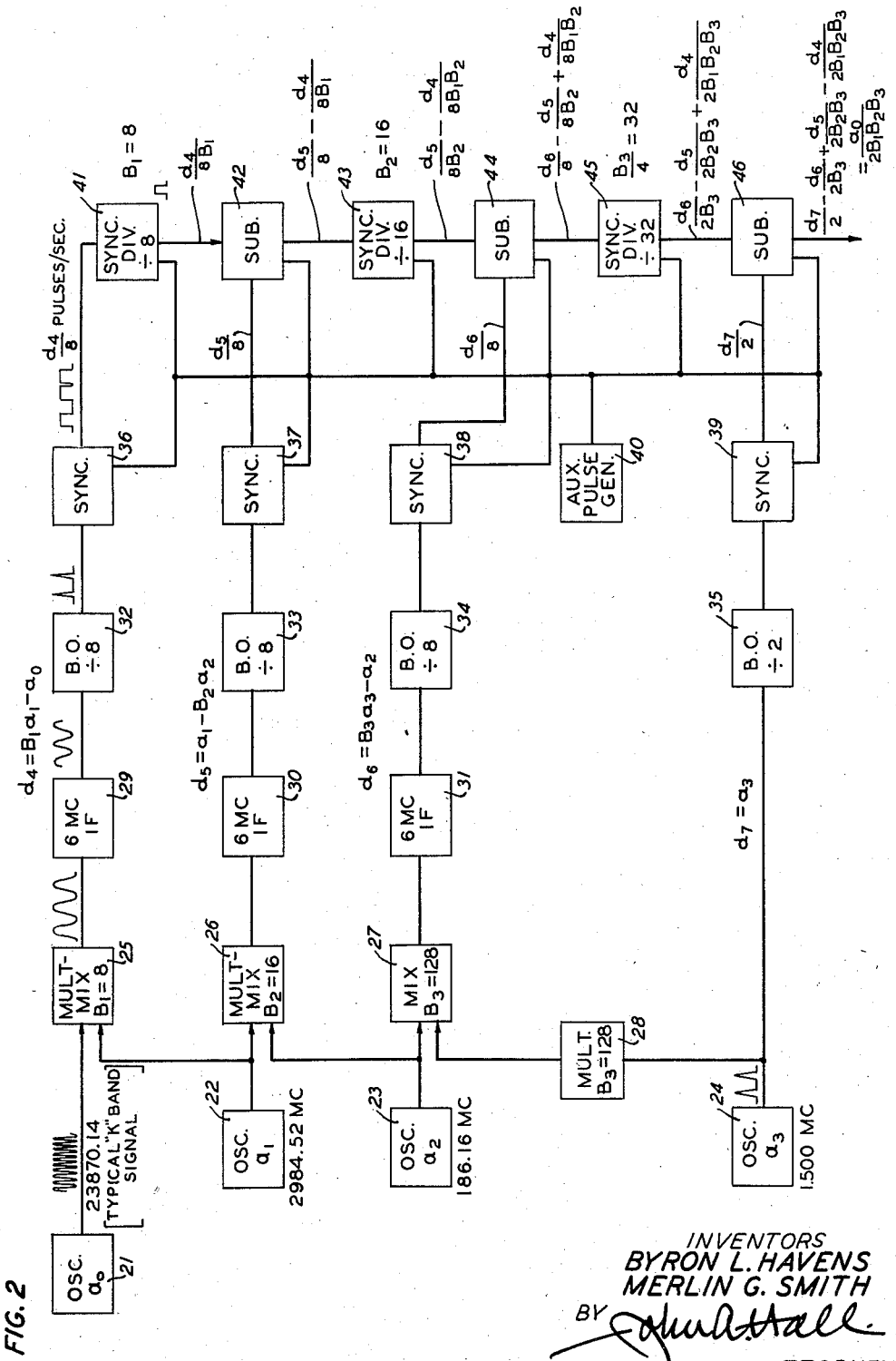

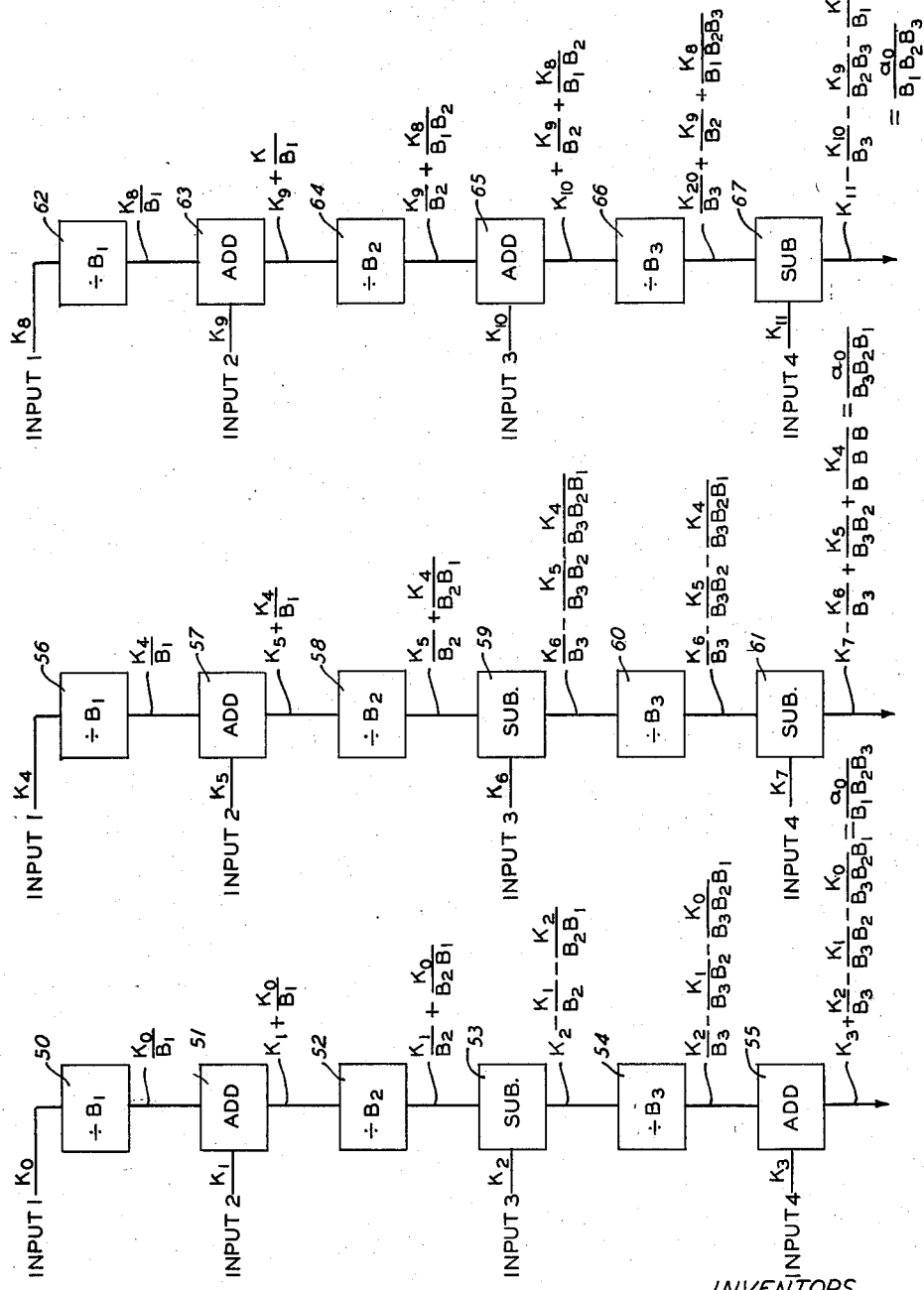

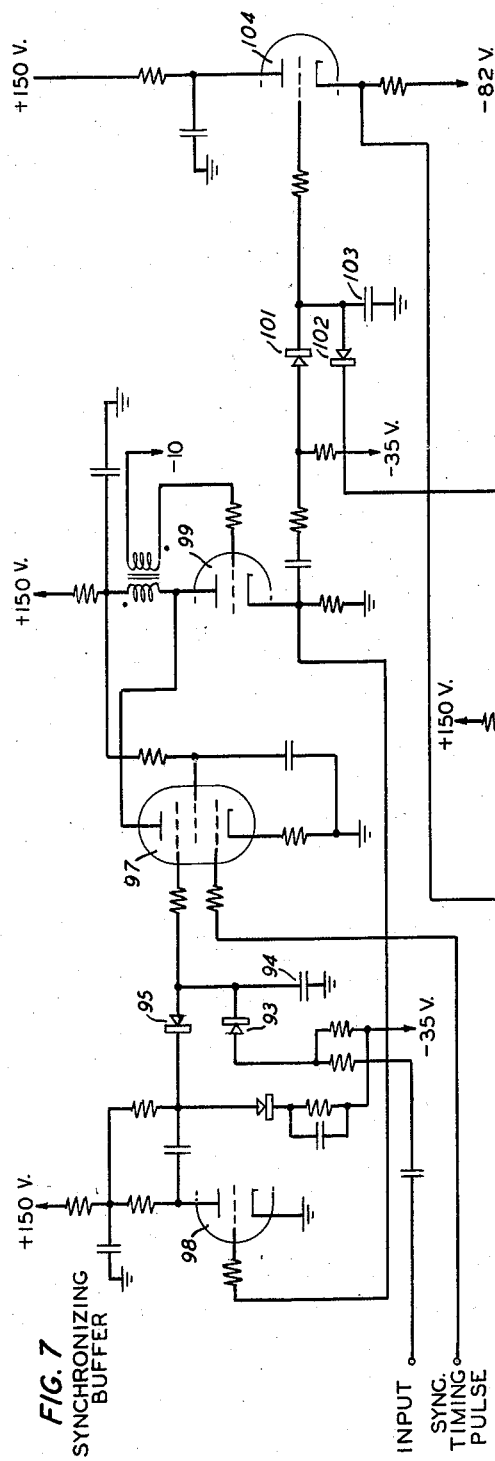
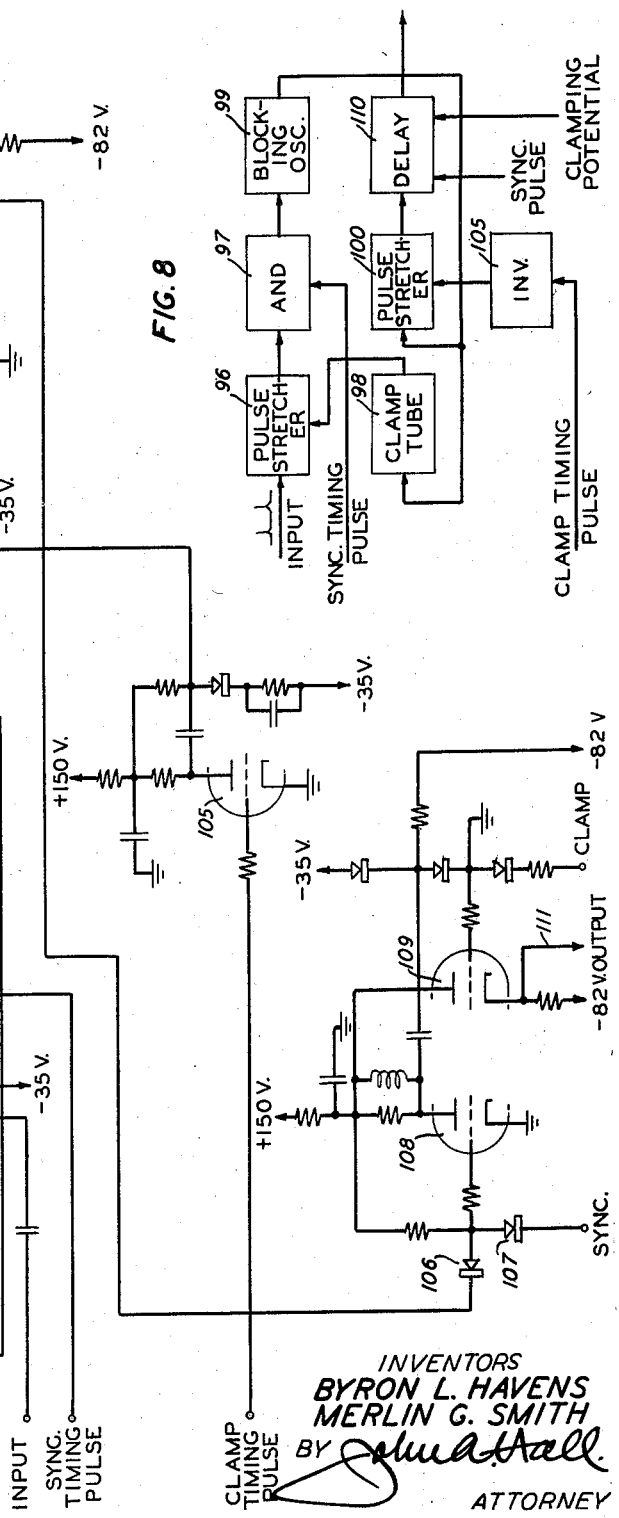

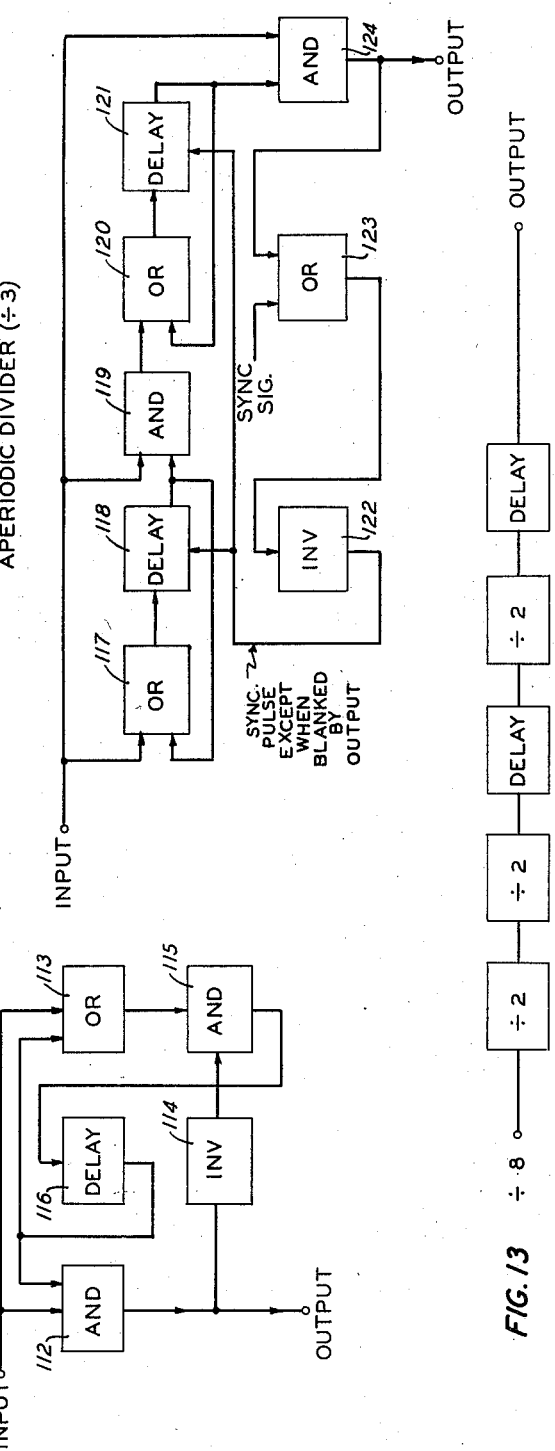

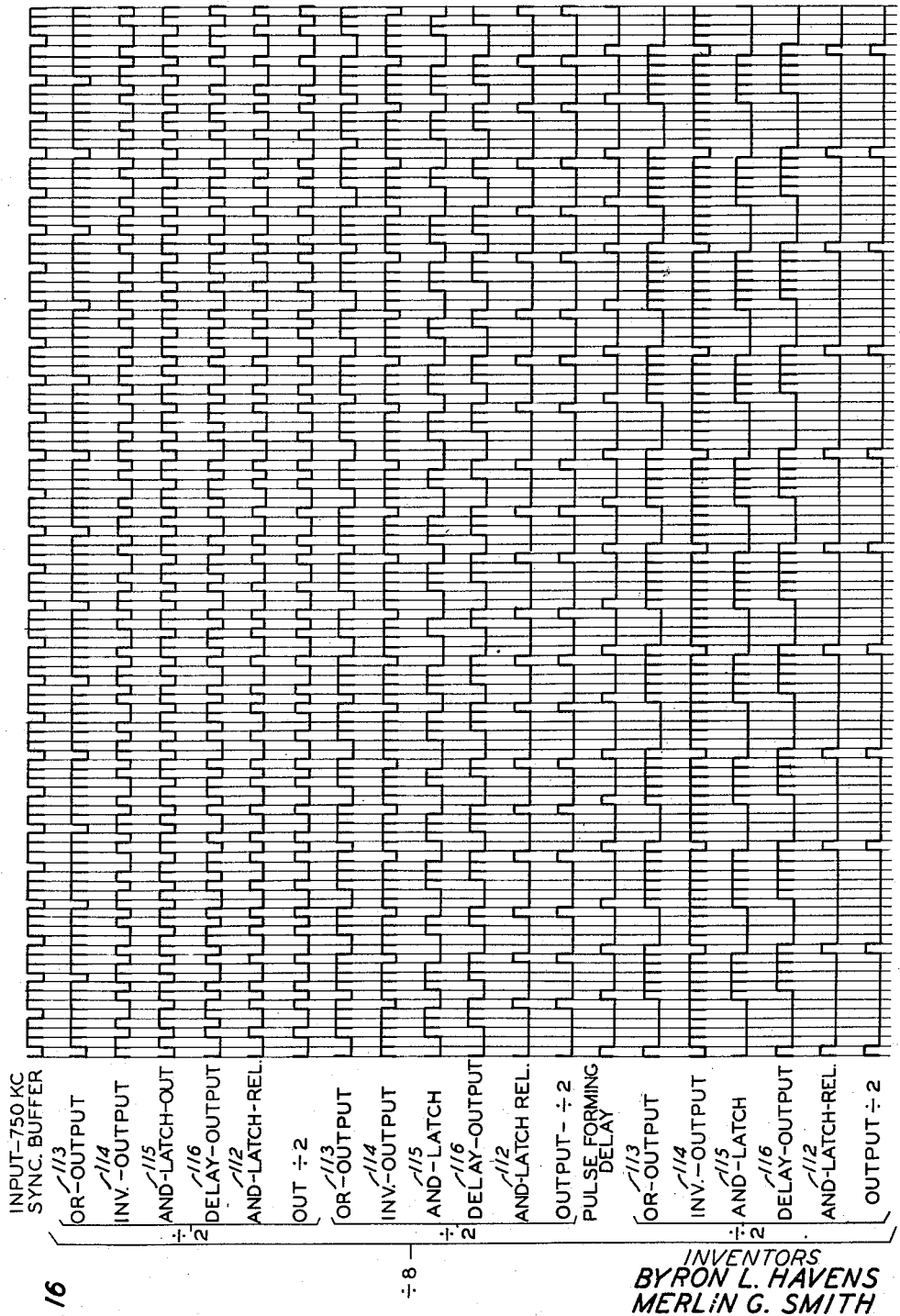

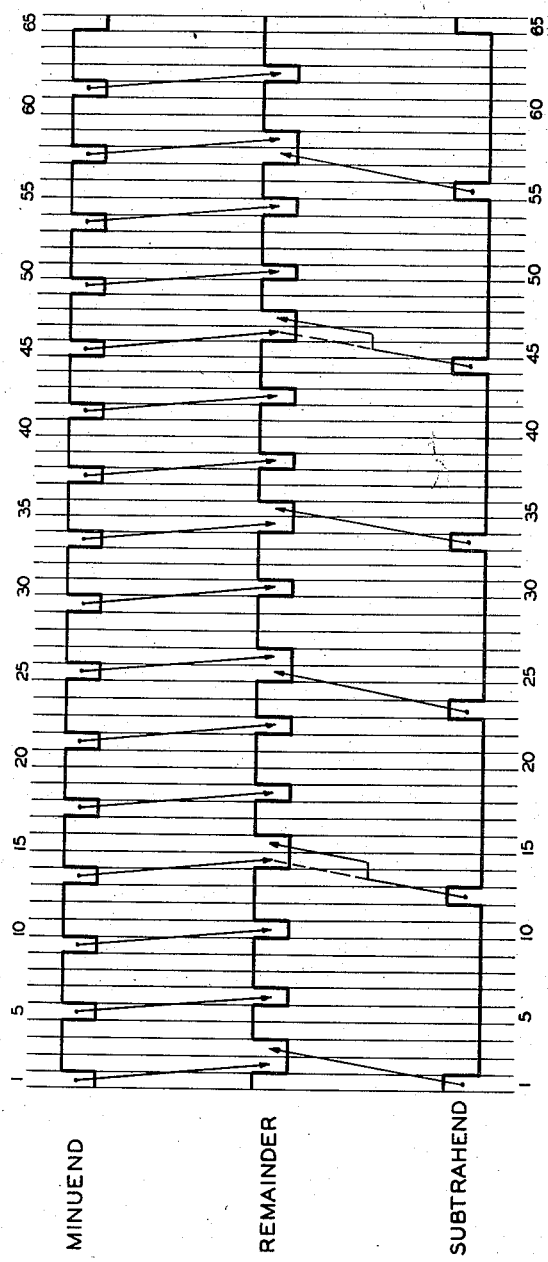

United States Patent Office 2,845,538
Patented July 29, 1958

2,845,538

SUPER HIGH FREQUENCY DIVIDERS

Byron L. Havens, Closter, and Merlin G. Smith, West Englewood, N. J., assignors to International Business Machines Corporation, New York, N. Y., a corporation of New York Application January 25, 1956, Serial No. 561,182

19 Claims. (Cl. 250—36)

This invention relates to frequency dividing means and particularly to means for deriving from a source of super high frequency believed to be invariant, a train of pulses having an average count bearing a constant relation to the value of said super high frequency.

The primary object of this invention is the provision of electronic means for obtaining from a source of super high frequency having an inherently high degree of frequency stability, a train of low frequency pulses having only an invariant mathematical relation to said high frequency. Stated otherwise, the primary object of the invention is to provide frequency step down means, which regardless of the regulation of the intermediate components employed, will introduce into the mathematical relation between the input and the output thereof only an invariant quantity or a mathematical constant.

The present invention consists of the use of a primary oscillator producing an invariant frequency, placed in a circuit arrangement including a plurality of other oscillators together with frequency multiplying, dividing, and subtracting means, whereby an output of an average given number of pulses per unit of time is obtained independent of the value or the regulation of said other oscillators and differing mathematically from the frequency of siad primary source only by a mathematical constant.

From a mathematical and theoretical standpoint the invention consists of a means for multiplying by a given factor the frequency of a comparatively low frequency source until it is within a given range of a high frequency source, mixing the multiplied low frequency and the high frequency to obtain the difference, or the beat frequency, dividing the difference by the same factor used for the said multiplication and then either adding or subtracting the obtained quotient from the said low frequency depending on the positive or negative aspect of the said beat frequency whereby the resulting remainder appears to be the high frequency divided by that constant used for the multiplying and dividing operations.

By way of explanation and from a physical standpoint, a beat frequency produced by the mixing of two other frequencies is the difference between the two and is always a positive quantity. However, where the beat frequency is to be taken as the difference between a frequency $a_0$ and a frequency $a_1B_1$, the physical quantity is the remainder of the smaller from the larger so that where this quantity is described algebraically the result may appear as a negative quantity. This is a mathematical fiction but is useful for the sake of uniform handling of the algebra on which the present invention depends.

Thus, where $a_0$ is the primary frequency, $a_1$ is the secondary or low frequency, and $B_1$ is the multiplying and dividing factor, then $$\frac{a_0}{B_1} = a_1 + \frac{a_0 - B_1 a_1}{B_1}$$

where $a_0$ is greater than $B_1 a_1$, and $$\frac{a_0}{B_1} = a_1 - \frac{a_0 - B_1 a_1}{B_1}$$

where $a_0$ is less than $B_1 a_1$, for in this case $a_0 - B_1 a_1$ is an algebraically negative quantity and when the equation is properly expressed as $$\frac{a_0}{B_1} = a_1 - \frac{B_1 a_1 - a_0}{B_1}$$

it will at once appear that the results are identical. It must be particularly pointed out, however, that in the first case the divided beat frequency must be added to the lower frequency while in the second case it must be subtracted therefrom.

It should also be understood that this step of multiplying the lower frequency, then dividing the beat frequency by the same factor and lastly adding or subtracting the quotient from the low frequency may be performed in one or a plurality of frequency steps or stages as will be explained in detail hereinafter, the choice of using one or more steps resting only on certain practical considerations.

Further, in accordance with the present invention, the arithmetical operations performed on the beat frequency or beat frequencies are digital in character whereby the quotients and the remainders become aperiodic since the time intervals usually known as wave length in trains of periodic pulses does not change. Dividing a train of pulses by two, by way of example, merely deletes every other pulse and subtracting a given number of pulses from a larger number merely deletes the smaller number from the pulses of the larger number without changing the width of the pulses.

In accordance with a preferred embodiment of the invention, the number of steps employed and the various values chosen have been selected with a view to producing a single standard pulse width for each operation and depending on this, synchronizible electronic elements have been employed whereby all operations may be paced by a single source of standard frequency.

Again, in accordance with the present invention one of the sources of frequency employed for the mathematical operations without having its value appear as a factor in the final result is also employed as the means for synchronizing the operations of the various electronic elements and again without having any reasonable deviation from a fixed value affect the result.

It will be brought out hereinafter that values are so chosen that a beat frequency produced is always lower than the synchronizing frequency employed and that the act of synchronizing this beat frequency consists essentially of shortening the wave length of such beat frequency and fitting the pulses thereof into the more numerous and shorter intervals of the synchronizing frequency not exactly at random but aperiodically and in accordance with a pattern which reflects the ratio of the beat frequency to the synchronizing frequency. It will then be understood that any reasonable deviation of the synchronizing frequency from a fixed standard is inconsequential and will in no manner affect the final result.

A feature of the invention is a synchronizing means which paces all arithmetical operations of the electronic elements without having its value enter into the results of such operations. The synchronizing means determines the periodicity and phase of the counts of arithmetically derived results and while it may affect the pattern of the aperiodic trains of pulses it does not affect the count. The synchronizing means herein termed a synchronizing buffer converts a periodic train of pulses into an aperiodic train, that is a long series of pulses having a large number deleted therefrom and it operates in such manner that the only result of a change in the periodicity thereof is to change the number of pulses deleted and the pattern in which they appear leaving the count of actual pulses unchanged.

Another feature of the invention is an aperiodic divider which acts substantially to delete from an aperiodic train of pulses a number of pulses as they occur in order and in accordance with the dividing factor represented by said divider. Thus a divide by two circuit will delete the first pulse and every other pulse thereafter regardless of the order in which they occur. Likewise a divide by three circuit will delete the first two pulses and every succeeding group of two pulses leaving a train containing every third pulse of the incoming aperiodic train.

Another feature of the invention is a subtractor or a Delete circuit which will act to delete from a periodic or an aperiodic train of pulses a periodic or an aperiodic train of pulses where the said pulses offered for deletion (the subtrahend) is smaller in number than the first said train (the minuend). The Delete circuit is arranged to produce a train of pulses in the remainder in exact correspondence with the pulses of the minuend (excepting that the remainder is always delayed one time interval by the pulse shaping delay circuit) and to delete therefrom pulses corresponding to those pulses constituting the subtrahend.

A feature of this Delete circuit is a latch which will store an electronic attempt to delete a pulse from the remainder in the same time interval during which no minuend pulse is available. In other words since there must be a minuend pulse which may be deleted, the attempt at deletion must be stored until a minuend pulse is available for deletion. After this latch is operated the first pulse provided by the minuend thereafter will be deleted and the latch will be released.

Another feature of the present invention is the substitution of a simple inverter circuit for the more complicated Delete circuit where the minuend is a periodic and unbroken train of pulses. As the value of the synchronizing oscillator frequency changes, the number of pulses per second in this unbroken train changes and it will be found and can be demonstrated that while the output of the last divide circuit may reflect the change in the value of this frequency, the number of blank spaces in the aperiodic train constituting the output of the last divider remains constant and actually equal to the output of a delete circuit which might be provided. Now, since it is the blank spaces which become pulses through inversion, it is clear that this constant number produced by an inverter is exactly the same as the output of a Delete circuit where the variable output of the last divider is subtracted from the variable value of the synchronizing frequency. Hence a feature of the invention is the use of a simple inverter in the last stage where the oscillator used in such last stage also functions as the synchronizing means.

The device of the present invention may be used for precisely timing an event where it is possible and practicable to transmit a pulse as a start signal and another pulse as a stop signal for then it becomes a simple matter to count the number of pulses transmitted over the output of the device in the interval between such starting and stopping signals, and by simple arithmetic this may be converted to time to a very high degree of accuracy.

Other features will appear hereinafter.

The drawings consist of twelve sheets having twenty figures, as follows.

Fig. 1 is a block diagram showing the theoretical arrangement of the components needed to count down from a super high frequency using a plurality of other frequencies in such a manner that the values and therefore any deviation from such values will not enter into the final result, a count of pulses per time unit related to the primary frequency only by a constant;

Fig. 2 is one embodiment of the invention showing another arrangement in which the various components are rigidly synchronized and the values of the operators are so chosen that the periodicity of the pulses at each stage of operation is sufficiently near the value of the frequency source used for synchronizing purposes that such operations will be certain and dependable;

Figs. 3, 4 and 5 are alternative arrangements illustrating several different arrangements each falling within the algebraic method of manipulation whereby the end result becomes a division of the primary frequency by a constant;

Fig. 7 is a schematic circuit diagram of a synchronizing buffer used to convert a stream of periodic pulses of a given frequency reasonably near the frequency of the source of synchronization to an aperiodic stream of pulses equal in number to said pulses of said periodic stream, each said pulse being compressed into the time interval of a synchronizing pulse;

Fig. 8 is a logical circuit diagram of a synchronizing buffer;

Fig. 10 is a logical circuit diagram of a divide by two circuit;

Fig. 11 is a logical circuit diagram of a divide by three circuit;

Fig. 13 is a block diagram showing the components of a divide by eight circuit;

Fig. 14 is a block diagram showing the components of a divide by sixteen circuit;

Fig. 15 is a block diagram showing the components of a divide by twenty-four circuit;

Fig. 16 is a time chart showing an aperiodic count 750,000 train of pulses synchronized to a one megacycle basis passing through a divide by eight circuit (less the final pulse forming final delay circuit indicated in Fig. 13);

Figure 19:
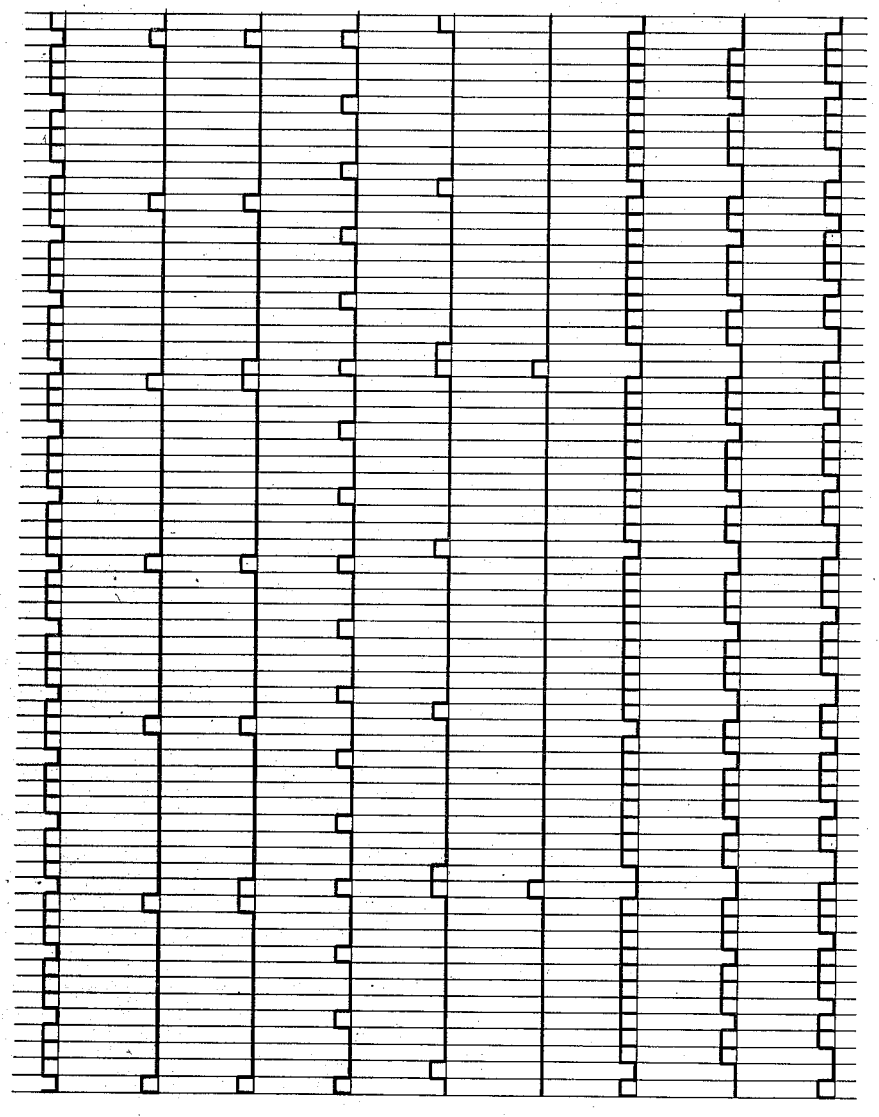

Fig. 17 is a schematic circuit diagram showing a Delete circuit, comprising a minuend path into which an aperiodic stream of a large number of pulses are entered, a subtrahend path into which an aperiodic stream of a much smaller number of pulses delivered by a divider circuit are entered and a remainder path over which the difference in the number of pulses is delivered to another circuit component such as a succeeding divider;

Fig. 18 is a logical circuit diagram of the Delete circuit of Fig. 17;

Fig. 19 is a time chart showing the operations of a Delete circuit in subtracting the exemplified 93,750 pulses per second from the exemplified 750,000 pulses per second to produce the exemplified 656,250 pulses per second; and Fig. 20 is a timing chart made up of the minuend, subtrahend and remainder graphs taken from Fig. 19 and arranged with indicating arrows to picture the sources of the deletions from an otherwise continuous and unbroken succession of outgoing pulses constituting the remainder.

In order to have a clear understanding of the operation of the circuits of the present invention, it will be helpful to have a general understanding of certain logical circuit electronic components and certain terminology employed in connection with these components. The basis of most of the operations depends on a pulse delay circuit hereinafter spoken of at times as the standard Havens Delay circuit and which is disclosed in Reissue Patent 23,699, issued August 18, 1953, to Byron L. Havens. This Delay circuit in turn depends on the use of a precisely controlled one megacycle source of frequency from which certain synchronizing pulses and clamping potentials are derived all in accordance with the disclosure in the application Serial Number 444,251, filed July 19, 1954, by Charles R. Borders. The specifications and subject matter of this patent and this application are incorporated herein as part of this application as though they were fully set forth in the body of this specification.

In the following description, certain terms are used and many basic circuit components are mentioned all of which are set forth in the prior art disclosures above set forth and some of which are shortly described as follows.

A time interval is one microsecond. A time interval may, of course, be of any convenient value but the circuits of the present invention have been constructed and arranged to operate on a megacycle basis. It may particularly be noted that the delay circuit disclosed in the Havens reissue patent has been constructed and arranged to receive a pulse on an input terminal during one time interval and to deliver a like pulse on an output terminal during a succeeding time interval one microsecond later. There is considerable tolerance in the operation of these circuits so when it is said that these circuits are constructed and arranged to operate on a megacycle basis it is to be understood that this is meant to include the value 1.001 megacycles which is actually used for convenience.

Throughout the circuitry of this device a common source of clamping potential and synchronizing pulses, clearly shown in the said Havens reissue patent, is employed. This serves to pace all operations described hereinafter.

Up and Down refer to potentials. In this electronic maze, each component, such for instance as a tube circuit, is arranged to be active when the potential on its control conductor is Up and inactive when such potential is Down. Generally, as in a cathode follower circuit, when the potential on an input terminal is Up, the potential on the output terminal is Up, and likewise when the potential on an input terminal is Down the potential on the output terminal is Down. It may be stated, merely by way of example, that a potential of plus 5 volts or more will constitute an Up condition and a potential of minus 30 volts or less will constitute a Down condition. Up means that the voltage present at a particular point is positive with respect to ground and Down means that the voltage present is negative with respect to ground. If the control grid of a vacuum tube is referred to as Down, it means that the voltage at that control grid is below the cutoff value of the vacuum tube or that, as in a cathode follower circuit, the output is held Down.

Numerous coincidence circuits are employed herein. An And circuit refers to a circuit which is operable to produce an Up condition on its output terminal only when all of its input terminals are Up. Such an And circuit may be constructed of a number of diodes all poled to hold the output terminal Down until all of the inputs are Up, or it may be constructed of a tube such as a pentode where the control grid and the suppressor grid must both be Up to produce conduction in the tube. An Or circuit refers to a circuit operable to produce an Up condition on its output terminal when any one or another or more of its input terminals are Up.

In the logical diagrams forming part of the present disclosure an And circuit is shown as a rectangle drawn about the designation And and having a plurality of input terminals and a single output terminal. An Or circuit is similarly shown.

A cathode follower circuit is a tube circuit having its anode firmly tied to a positive potential source (relative to the cathode) or otherwise arranged so that the grid constitutes an input and the cathode or cathode circuit constitutes an output. When the grid is Up, the cathode will go Up and when the grid is Down, the cathode will go Down. A cathode follower is used wherever the output of some previous circuit, such as an And or Or circuit, would be overloaded by the following circuits. A cathode follower is not always shown since it merely acts to relay or fortify the output of some other circuit and does not alter the operations of the circuit as a whole, but when shown is in the form of a rectangle enclosing the designation CF and having a single input and a single output terminal.

The most important of the circuit components used herein is the Havens Delay circuit, shown as a rectangle enclosing the designation Delay. This circuit performs a twofold function, that of actually delaying an incoming pulse to a next succeeding time interval and as a pulse shaping means, since regardless of the mutilation of an incoming pulse which is sufficient to trigger the device, the outgoing pulse one time interval thereafter is full and complete and of a standard shape.

A latch is a circuit component used to hold or maintain a pulse or a signal. The circuit is simple and contains essentially only an And circuit and a Delay circuit, the output of each being connected to the input of the other. When the control circuit of the And circuit is Up and a signal is introduced into this circuit, the signal will continuously circulate therein until the control circuit is brought Down. The Delay circuit acts to constantly regenerate the signal which it transmits from its output through the enabled And circuit to its own input. Another form of latch comprises essentially a Delay and an Or circuit placed in a ring so that a signal introduced therein as by the enablement of the Or circuit over another input will continue to operate indefinitely or until the Delay is disabled as by being deprived of its incoming synchronizing signal.

A pulse stretcher is a circuit which responds to a pulse to establish a given output condition and then maintains such condition over a given period of time, marked as terminated by some standard terminating pulse. Generally speaking the incoming pulse is of short duration, often the output of a blocking oscillator, so that the pulse stretcher is a circuit which responds to this incoming pulse and maintains an established condition until another pulse automatically timed is received to cause the termination of such condition. Often the pulse stretcher consists essentially of a condenser having a charging and a discharging circuit. An incoming pulse delivered by a blocking oscillatior circuit will act to charge this condenser and this will maintain the charge sufficiently long to enable the circuit being served until a discharging pulse is received. The incoming and discharging pulses may be spikes whereas the outgoing pulse is a square topped signal.

A blocking oscillator is a component often used to forward a pulse where the signal consists of a potential pulse and where circuit conditions prohibit any substantial current drain. The blocking oscillator therefore is a device which responds to a voltage pulse and produces a short pulse of useful current value, such for instance as sufficient current value for charging the condenser of a pulse stretcher. The principle upon which a blocking oscillator operates is a regenerative circuit which is started or triggered into operation by the incoming pulse and which through regeneration automatically produces its outgoing pulse, the operation being extremely rapid so that the outgoing pulse for all practical purposes is coincident with the incoming pulse.

The grid circuit may be adjusted in such a manner that the device is disabled at the time of the reception of a succeeding incoming pulse whereby for each two (or more) incoming pulses only a single outgoing pulse is produced so that such a blocking oscillator becomes a divider circuit.

The synchronizing buffer is an electronic circuit which is controlled rigidly by the synchronizing and clamping pulses derived from a one megacycle source of frequency and which converts a periodic stream of pulses of a periodicity something less than a megacycle into an equal number of outgoing pulses in groups of pulses, the pulses within each of said groups being rigidly synchronized to occur within the limits of the microsecond intervals defined by said synchronizing and clamping pulses.

Depending on the ratio of the periodicity of the input to one megacycle these outgoing pulses will be in a variety of pulse trains. By way of example, if the input is precisely of seven hundred and fifty kilocycles, the outgoing pulses will be in recurrent groups of three in each group of four microseconds, but if there is a slight deviation from this, the pattern will be altered. Nevertheless in an appreciable period the number of one microsecond outgoing pulses will average the number of incoming pulses.

It is believed that with this short description of various components, the complete system will be easily understood.

In Fig. 1 the general aspects of the invention are shown in the form of a block diagram. Oscillators 1, 2, 3 and 4 respectively, supply electrical energy at frequencies $a_0$, $a_1$, $a_2$ and $a_3$ respectively, wherein $a_0$ is greater than $a_1$, $a_1$ is greater than $a_2$, and $a_2$ is greater than $a_3$. Oscillator 1 impresses its output on one of the inputs of mixer amplifier 8. Oscillator 2 impresses its output on the input of frequency multiplier 5 and on one of the inputs of mixer amplifier 9. Oscillator 3 impresses its output on the input of frequency multiplier 6 and on one of the inputs of mixer amplifier 10. Oscillator 4 impresses its output on the input of frequency multiplier 7 and on the input of pulse generator 14. Frequency multipliers 5, 6 and 7 respectively multiply their input frequencies by factors $B_1$, $B_2$ and $B_3$.

The output of frequency multiplier 5, namely frequency $B_1a_1$ and the frequency $a_0$, are impressed on the inputs to mixer amplifier 8, the output of which is tuned to the beat frequency $(a_0-B_1a_1)$, hereinafter referred to as frequency $d_0$.

The output of frequency multiplier 6, namely frequency $B_2a_2$ and the frequency $a_1$, are impressed on the inputs to mixer amplifier 9, the output of which is tuned to the beat frequency $(a_1-B_2a_2)$, hereinafter referred to as frequency $d_1$.

The output of frequency multiplier 7, namely frequency $B_3a_3$ and the frequency $a_2$, are impressed on the inputs to mixer amplifier 10, the output of which is tuned to the beat frequency $(a_2-B_3a_3)$, hereinafter referred to as frequency $d_2$.

The output frequency $a_3$ of secondary oscillator 4 is, for convenience, considered to be equal to frequency $d_3$. This frequency $d_3$ is impressed on the input of pulse generator 14.

Pulse generators 11 through 14 are very similar. Each accepts a periodic voltage wave that is essentially sinusoidal and renders a positive output pulse for each cycle of its input voltage wave. Thus from Fig. 1, it will be seen that pulse generator 11 has impressed upon its input a periodic voltage wave of frequency $d_0$ and renders $d_0$ rectangular pulses per second. Correspondingly, pulse generators 12, 13 and 14, respectively, have impressed on their inputs periodic frequencies of $d_1$, $d_2$ and $d_3$ rectangular pulses per second. In brief, the pulse generators each render a rectangular output pulse in response to one cycle of their periodic input.

A broken line encloses a plurality of properly interconnected pulse frequency dividers and adders. The dividers and adders properly combine the rectangular pulses $d_0$, $d_1$, $d_2$ and $d_3$ so as to render an output that is considerably lower in the number of pulses per second than the output of the primary oscillator 1 and is related by a constant to the output frequency $a_0$ of said primary oscillator. Further, the low frequency output of the plurality of dividers and adders has the high stability factor for of the output of the primary oscillator 1. These conclusions will appear clearly from the detailed discussion that follows.

The rectangular pulses at frequency $d_0$ are impressed upon the input of divider 15. This divider 15 essentially divides the frequency of the input pulses by a factor $B_1$ (the same factor used to multiply the frequency $a_1$ in the multiplier 5). Thus the output of divider 15 is a series of rectangular pulses at a frequency of $d_0$ divided by $B_1$. The output of divider 15 plus the output of pulse generator 12 are combined by adder 16 to render a series of rectangular pulses at a frequency of $d_0/B_1+d_1$ pulses per second. The output of adder 16 is impressed upon input of divider 17 which effectively divides the frequency by a factor of $B_2$. Thus divider 17 renders a series of rectangular output pulses at a frequency of approximately $d_0/B_1B_2+d_1/B_2$. The output of divider 17 plus the output of pulse generator 13 are combined by adder 18 to render a series of rectangular pulses at a frequency of $$\frac{d_0}{B_1B_2}+\frac{d_1}{B_2}+d_2$$

The output of adder 18 is impressed on the input of divider 19 which effectively divides the frequency of its input by a factor of $B_3$. Thus the output of divider 19 is a series of rectangular pulses of frequency $$\frac{d_0}{B_1B_2B_3}+\frac{d_1}{B_2B_3}+\frac{d_2}{B_3}$$

The output of divider 19 plus the output of pulse generator 14 are combined by adder 20 to render a series of rectangular pulses of a frequency of $$\frac{d_0}{B_1B_2B_3}+\frac{d_1}{B_2B_3}+\frac{d_2}{B_3}+d_3$$

But, by definition $$d_3=a_3$$
$$d_2=a_2-B_3a_3$$
$$d_1=a_1-B_2a_2$$
$$d_0=a_0-B_1a_1$$

Substituting these values in the expression for the output of adder 20, we have $$\frac{a_0-B_1a_1}{B_1B_2B_3}+\frac{a_1-B_2a_2}{B_2B_3}+\frac{a_2-B_3a_3}{B_3}+a_3$$

which by algebraic manipulation becomes $$\frac{a_0}{B_1B_2B_3}-\frac{a_1}{B_2B_3}+\frac{a_1}{B_2B_3}-\frac{a_2}{B_3}+\frac{a_2}{B_3}-a_3+a_3$$

which immediately reduces to $$\frac{a_0}{B_1B_2B_3}$$

Thus $$\frac{a_0}{B_1B_2B_3}=\frac{d_0}{B_1B_2B_3}+\frac{d_1}{B_2B_3}+\frac{d_2}{B_3}+d_3$$

and it thus appears that the output of adder 20 is the frequency of the primary oscillator $a_0$ divided by a constant, the product of the three divisors $B_1$, $B_2$ and $B_3$.

This might be looked upon in another way. The output of the mixer 8 is equal to $a_0-B_1a_1$ which, after passing through the divider 15, becomes $$\frac{a_0}{B_1}-a_1$$

The output of the mixer 9 is equal to $a_1-B_2a_2$ and this added to the output of the divider 15 renders the output of the adder 16 equal to $$\frac{a_0}{B_1}-B_2a_2$$

Likewise the value at the output of the components are as follows

Divider 15   $\dfrac{a_0}{B_1} - a_1$

Adder 16   $\dfrac{a_0}{B_1} - B_2 a_2$

Divider 17   $\dfrac{a_0}{B_1 B_2} - a_2$

Adder 18   $\dfrac{a_0}{B_1 B_2} - B_3 a_3$

Divider 19   $\dfrac{a_0}{B_1 B_2 B_3} - a_3$

Adder 20   $\dfrac{a_0}{B_1 B_2 B_3}$

It should be noted that if the mixer 9 is eliminated so that the input of the pulse generator 12 is $a_1$ instead of $a_1 - B_2 a_2$, then the output of the adder 16 would be $$\frac{a_0}{B_1}$$

Thus, the combination of a secondary frequency means to multiply this and mix the product with the primary frequency, means to then divide the resulting beat frequency by the same factor used for the multiplication and a final means to add this quotient to the secondary frequency, results in the division of the primary frequency by such factor, the result being the control of the primary frequency by a constant. It should be noted that this manipulation may be carried out in one or more stages, three stages being shown in Fig. 1. The number of stages to be employed is a matter of choice, it being noted that as the number of stages is increased the final divisor increases to a large amount. Other practical reasons for using a plurality of stages will be pointed out hereinafter.

It should further be noted that regardless of the number of stages employed and the number of secondary frequencies used, the actual value of these secondary frequencies is eliminated from the final result so that the division of the primary super high frequency is achieved by employing such other frequencies without having their regulation or any deviation from their given values affect the result.

Let us cogitate on the results of such a system. Let us assume the primary frequency to be 23,870.14 mc., the frequency of the ammonia line conventionally used for the control of the so-called atomic clocks. A commercially available oscillator used as a secondary source produces a frequency of 2984.52 mc. If this is multiplied by a factor of 8, it becomes 23,876.16 so the output of the mixer becomes 6.02 mc., a frequency not difficult to handle. This may readily be divided by 8 so that the output of the divider 15 will become .7525 mc., actually a frequency of practically three quarters of a megacycle despite the fact that it is expressed algebraically as the difference of two frequencies each very difficult to handle.

$$\frac{a_0}{B_1} - a_1$$

23,870.14/8 − 2984.52
2983.7675 − 2984.52 = −.7525

The output of the adder 16 (assuming only a one stage device) becomes $$2984.52 - .7525 = 2983.7675$$

Now, for the sake of argument, let us assume that the secondary frequency cannot be precisely controlled and that in drifting it reaches a value of 2983.00 mc. The output of the mixer would then be $$23,870.14 - 23,864.00 = 6.14$$

which, divided by 8, would be 6.14/8=.7675. When the value 2983.00 is added to this the result (as the output of adder 16) becomes 2983.7675, exactly the same figure produced in the first example. Thus it may be seen that the actual value of the secondary frequency is immaterial. Practically the secondary frequency should not be allowed to reach a value where the beat frequency, the output of the mixer 8 becomes difficult to handle. For practical reasons which will appear hereinafter, the output of the mixers 8, 9 and 10 will be held very closely to the same figure so that no such deviation as that just pointed out would occur, this extraordinary example being used herein by way of emphasis and to make it clear that the actual value of the secondary frequency is immaterial.

Referring to Fig. 2, a second embodiment is disclosed in block diagram form. Primary oscillator 21 is a high frequency oscillator emitting a signal in the K band range, and it may be of the type that employs the molecular resonance of a gas to render a highly stable, super high frequency output. For purposes of this disclosure, let it be assumed that the output of primary oscillator 21 is $a_0$ where $a_0$ equals 23870.14 megacycles. The secondary oscillator 22 may be of an ultra high frequency type oscillator of a commercially available type having an output of $a_1$ equal to the frequency of 2984.52 megacycles. The secondary oscillator 23 is a very high frequency oscillator having an output of 186.16 megacycles. The secondary oscillator 24 is a high frequency oscillator having an output of 1.5 megacycles.

The output of primary oscillator 21 is impressed on one of the inputs of multiplier mixer circuit 25. The output of secondary oscillator 22 is impressed on the second input of multiplier mixer 25 and on the first input of multiplier mixer 26. The output of secondary oscillator 23 is impressed on the second input of multiplier mixer 26 and on the first input mixer circuit 27. The output of secondary oscillator 24 is impressed on the input of multiplier circuit 28 and on the input of divider circuit 35. The multiplier mixers 25 and 26 may each be of a commercially available type of harmonic mixers.

The dividing circuits 32, 33, 34 and 35 may respectively be made up of a plurality of serially connected blocking oscillators of the type shown and described hereinafter. The division-by-2 circuit denoted by reference character 35 may consist of a blocking oscillator circuit of a type which will be more fully described hereinafter and which is serially connected to a pair of Havens' Delay circuits.

The intermediate frequency amplifiers 29, 30 and 31 consist of staggered tuned amplifiers having a band width of approximately two megacycles at a center frequency of 6 mc. An intermediate frequency amplifier generally of this type is described in the volume entitled "Vacuum Tube Amplifiers" by Valley and Wallam, Radiation Laboratory Series, No. 18, McGraw-Hill, 1948.

The synchronizer or synchronizing buffer circuits 36, 37, 38 and 39 are of a type to be more fully explained hereinafter and consist generally of means to convert a periodic train of pulses such as the output of a blocking oscillator into an aperiodic train of square topped pulses each having a duration equal to the wave length provided by the synchronizing frequency provided by the auxiliary pulse generator 40. Since this frequency is higher than the output frequencies of the blocking oscillator dividers 32, 33, 34 or 35, some of the time intervals provided in the output of these synchronizer circuits will be filled with pulses transmitted from the dividers 32, 33, 34 and 35 and others will be blank, thus changing the periodic output of a blocking oscillator divider into an aperiodic output of a synchronizer. Each output will have the same number of pulses.

The auxiliary pulse generator 40 is a combination of a precisely regulated (one megacycle) source of frequency and a clamp and synchronizing generator controlled thereby of a type shown and described in the Application of Charles R. Borders, Serial Number 444,251, filed July 19, 1954.

Two types of division circuit are shown in Fig. 2, the blocking oscillator divide by eight circuit 32 and the synchronized divide by eight circuit 41. The first is essentially a blocking oscillator circuit having circuits so adjusted that at a given frequency of input (herein 6 megacycles by way of example) only every eighth input pulse is converted into an output pulse. In actual practice these devices consist of a cascade of three divide by two blocking oscillator circuits. Where the input of the first in line is a substantially six megacycle frequency, its circuits are so adjusted that only every other one of the input pulses produces an output pulse. The same is true for the next two in line but it will be apparent that the internal arrangements are different, the first being adjusted to respond to an input of six megacycles, the second to an input of three megacycles and a third to an input of one and a half megacycles whereby the output of three quarters of a megacycle is produced.

The synchronized divider circuit 41 is of a different character. It is essentially digital in character and its operation will be fully explained hereinafter in connection with Figures 10, 12, 13 and 16.

The divide by sixteen circuit 43 consists, as indicated in Fig. 14, of four synchronized aperiodic divide by two circuits connected in series with a pair of Delay circuits properly interspersed in line for pulse shaping purposes. The divide by 32 circuit 45 consists of a similar arrangement including five synchronized aperiodic divide by two circuits.

The output of oscillators 21, 22, 23 and 24 are respectively periodic substantially sinusoidal voltage waves of frequencies, $a_0$, $a_1$, $a_2$ and $a_3$.

The first input of amplifier mixer 25 is frequency $a_0$. The second input is the frequency $a_1$. The output of multiplier mixer 25 is a beat frequency $d_4$ which is equal to $B_1 a_1 - a_0$ where $B_1$ is a multiplication factor of the multiplier mixer circuit 25. The first input of multiplier mixer circuit 26 has impressed thereon the frequency $a_1$ whereas the second input of said multiplier mixer circuit has impressed thereon the frequency $a_2$. The output of multiplier mixer circuit 26 is $d_5$ which is equal to $a_1 - B_2 a_2$ where $B_2$ is a multiplication factor of multiplier mixer circuit 26. Input 1 of mixer circuit 27 has impressed thereon the frequency $a_2$ whereas input 2 of mixer circuit 27 has impressed thereon the frequency $B_3 a_3$, i. e., the output of multiplier 28. The output of mixer 27 is a beat frequency $d_6$ which is equal to $B_3 a_3 - a_2$ where $B_3$ is the multiplication factor of multiplier circuit 28. The output of multiplier mixer circuit, namely, frequency $d_4$, is amplified by intermediate frequency amplifier 29 and impressed on the input of the blocking oscillator dividing chain 32. The output of multiplier mixer circuit 26, namely, frequency $d_5$, is amplified by intermediate frequency amplifier 30 and impressed on the input of blocking oscillator dividing chain 33. The output of mixer circuit 27, namely, frequency $d_6$, is amplified by intermediate frequency amplifier 31 and impressed on the input of blocking oscillator dividing chain 34. As is evident from Fig. 2, the blocking oscillator divider 35 has impressed on its input a frequency of $a_3$, which, for convenience, is hereinafter referred to as frequency $d_7$ (frequency $a_3$ is equal in cycles per second to frequency $d_7$).

The blocking oscillator dividing chains 32, 33 and 34 respectively, divide the frequency of their inputs by a factor of 8 whereas the blocking oscillator divider 35 divides its input by a factor of 2. Thus the output of dividers 32, 33 and 34 is respectively a series of pulses having the general configuration of those at the output of divider 32 and at frequencies of $$\frac{d_4}{8} \frac{d_5}{8} \text{ and } \frac{d_6}{8}$$

The output pulses of divider 35 are generally of the same configuration as those at the output of divider 32 but are at a frequency of $$\frac{d_7}{2}$$

Synchronizing circuits 36, 37, 38 and 39 respectively, accept the outputs of dividers 32, 33, 34 and 35 and produce synchronized rectangular based outputs. Each synchronizing circuit produces a synchronized rectangular output pulse in response to an input pulse. Further, the output of all four synchronizing circuits, namely, 36 through 39, are synchronized by the auxiliary pulse generator 40. Thus all four synchronizing circuits have their outputs synchronized one with respect to the other.

The synchronized outputs of the four synchronizing circuits 36 through 39 are fed to the synchronized divider and subtraction circuits in the right hand portion of Fig. 2. Briefly, the input of synchronized divider 41 has impressed thereon a series of synchronized rectangular pulses of frequency $$\frac{d_4}{8}$$

Divider 61 effectively divides the frequency of its input by a factor of $B_1$ ($B_1$ being equal to 8). Thus the output of divider 41, which is impressed on the first input of the synchronized subtraction circuit 42, is a series of rectangular pulses at a frequency of $$\frac{d_4}{8B_1}$$

Input 2 of synchronized subtraction circuit 42 has impressed thereon a series of synchronized rectangular pulses of frequency $$\frac{d_5}{8}$$

The output of synchronized subtraction circuit 42 which is impressed on the input of synchronized divider circuit 43 is a series of rectangular pulses at a frequency of $$\frac{d_5}{8} - \frac{d_4}{8B_1}$$

The synchronized divider circuit 43 effectively divides the frequency of its input by a factor of $B_2$ (where $B_2$ is equal to 16). Thus, the output of synchronized divider circuit 43 which is impressed on input 1 of the synchronized subtraction circuit 44 is a series of rectangular pulses at a frequency of $$\frac{d_5}{8B_2} - \frac{d_4}{8B_1 B_2}$$

Input 2 of synchronized subtraction circuit 44 has impressed thereon a series of rectangular pulses at a frequency of $$\frac{d_6}{8}$$

Thus the output of synchronized subtraction circuit 44 which is applied to input of the synchronized divider circuit 45 is a series of rectangular pulses at a frequency of $$\frac{d_6}{8} - \frac{d_5}{8B_2} + \frac{d_4}{8B_1 B_2}$$

Synchronized divider 45 effectively divides the frequency of its input by a factor of $$\frac{B_3}{4} \left( \text{where } \frac{B_3}{4} = 32 \right)$$

Thus the output of synchronized divider circuit 45, which is applied to input 1 of synchronized subtraction circuit 46 is a series of rectangular pulses at a frequency of $$\frac{d_6}{2B_3} - \frac{d_5}{2B_2B_3} + \frac{d_4}{2B_1B_2B_3}$$

Input 2 of synchronized subtraction circuit 46 has impressed thereon a series of rectangular pulses at a frequency of $$\frac{d_7}{2}$$

Thus the output of synchronized subtraction circuit 46 is a series of rectangular pulses at a frequency of $$\frac{d_7}{2} - \frac{d_6}{2B_3} + \frac{d_5}{2B_2B_3} - \frac{d_4}{2B_1B_2B_3}$$

The afore-recited quantity will be shown in the algebraic discussion that follows to be equal to $$\frac{a_0}{2B_1B_2B_3}$$

Thus it will be apparent that the low frequency output is related to the high frequency output of primary oscillator 21 by a constant, i. e. the factor $$\frac{1}{2B_1B_2B_3}$$

It will now be shown how the quantity $\frac{d_7}{2} - \frac{d_6}{2B_3} + \frac{d_5}{2B_2B_3} - \frac{d_4}{2B_1B_2B_3}$ is equal to $\frac{a_0}{2B_1B_2B_3}$ By definition $d_4 = B_1 a_1 - a_0$. Thus, by transposition, we have Expression 1, which is $-a_0 = d_4 - B_1 a_1$. By definition $d_5 = a_1 - B_2 a_2$ which, by transposition, Expression 2 is obtained; $a_1 = d_5 + B_2 a_2$. Now substituting the value of $a_1$ from Expression 2 into Expression 1, the following relationship is obtained. $-a_0 = d_4 - B_1(d_5 + B_2 a_2)$. This relationship reduces to Expression 3;

$$-a_0 = d_4 - B_1 d_5 - B_1 B_2 a_2$$

Now by definition $d_6 = B_3 a_3 - a_2$ and $a_3 = d_3$. Thus combining and transposing, Expression 4 is obtained;

$$-a_2 = d_6 - B_3 d_7$$

Now substituting the value of $-a_2$ obtained from Expression 4 in Expression 3, we obtain the following relationship. $-a_0 = d_4 - B_1 d_5 + B_1 B_2 (d_6 - B_3 d_7)$. This relationship reduces Expression 5 to $$-a_0 = d_4 - B_1 d_5 + B_1 B_2 d_6 - B_1 B_2 B_3 d_7$$

Now dividing Expression 5 by the quantity $-2B_1B_2B_3$ we obtain $$\frac{a_0}{2B_1B_2B_3} = \frac{d_7}{2} - \frac{d_6}{2B_3} + \frac{d_5}{2B_2B_3} - \frac{d_4}{2B_1B_2B_3}$$

Thus it is shown that the output of the circuit arrangement of Fig. 2 is a series of rectangular pulses of frequency $$\frac{a_0}{2B_1B_2B_3}$$

Further, this establishes that the low frequency output is related to the high frequency K band signal of primary oscillator 21 by a constant and that the low frequency output has the same high stability as the high frequency.

Now to anticipate the further description somewhat, it will be noted that certain values of the frequency of oscillators have been assigned, and certain multiplying values of the mixers are noted. It will appear on inspection that the output of each mixer is in the range of six megacycles and that the output of the following blocking oscillators is in the range somewhat under one megacycle.

The auxiliary pulse generator 40 is one designed to provide pulses in the range of one megacycle and therefore the synchronizers 36 to 39 are controlled to operate at this same rate. It will appear hereinafter that the synchronized dividers 41, 43 and 45 and the subtractors 42, 44 and 46 are what are known as logical circuits devised and And circuits, Or circuits, Inv. circuits and standard Delay circuits and that the Delay circuits are constructed and arranged to operate properly in the megacycle range. Therefore this chain of logical circuits will operate properly to produce an end result rigidly related to the primary frequency and regardless of the deviation of the other frequencies over a reasonably great range.

Given the various frequencies noted in Fig. 2, the following values, by way of example, may be noted.

| | |
|---|---:|
| Output of oscillator $a_0$_____megacycles__ | 23,870.14 |
| Output of oscillator $a_1$_____megacycles__ | 2,984.52 |
| Output of oscillator $a_2$_____megacycles__ | 186.16 |
| Output of oscillator $a_3$_____megacycles__ | 1.50 |
| Value of $B_1$_____ | 8.00 |
| Value of $B_2$_____ | 16.00 |
| Value of $B_3$_____ | 128.00 |
| Output of mixer 25_____megacycles__ | 6.02 |
| Output of mixer 26_____megacycles__ | 5.96 |
| Output of mixer 27_____megacycles__ | 5.84 |
| Output of synchronizer 36_____megacycles__ | .7525 |
| Output of synchronizer 37_____megacycles__ | .754 |
| Output of synchronizer 38_____megacycles__ | .73 |
| Output of synchronizer 39_____megacycles__ | .75 |
| Output of divider 41_____megacycles__ | .094 |
| Output of subtractor 42_____megacycles__ | .660 |
| Output of divider 43_____megacycles__ | .04125 |
| Output of subtractor 44_____megacycles__ | .68875 |
| Output of subtractor 46_____megacycles__ | .72848 |
| Value of $2B_1B_2B_3$_____ | 32,768 |
| $a_0/32{,}768$ _____megacycles__ | .72848 |

Again, it is to be noted that the output of the mixers is in the range of six megacycles which may readily be amplified so that operations beyond these amplifiers may be carried out with great certainty without any danger of distorting the values of the derived currents.

Fig. 3 discloses an alternative embodiment employing a series of divider, addition and subtraction circuits. The circuitry of Fig. 3 has four inputs which respectively receive a synchronized series of pulses at frequencies $k_0$, $k_1$, $k_2$ and $k_3$. Input 1 at a frequency of $k_0$ is impressed on the input of divider circuit 50. Divider circuit 50 effectively divides the frequency of its input by a factor of $B_1$. Thus the output of divider 50 is a series of synchronized pulses at a frequency of $$\frac{k_0}{B_1}$$

Input 2 of the circuit of Fig. 3 is connected to the second input of adder 51, has impressed thereon a series of synchronized pulses at a frequency of $k_1$. Thus the output of adder 51 which is impressed on the input of divider 52 is a series of synchronized pulses at a frequency of $$k_1 + \frac{k_0}{B_1}$$

Divider circuit 52 effectively divides the frequency of its input by a factor of $B_2$. Thus the output of divider 52, which is impressed on input 1 of subtraction circuit 53, is a series of synchronized pulses at a frequency of $$\frac{k_1}{B_2} + \frac{k_0}{B_2B_1}$$

The second input of subtractor circuit 53 is connected to input 3 of the circuit of Fig. 3. Thus the output of subtraction circuit 53 which is impressed on the input of divider 54 is a series of synchronized pulses at a frequency of $$k_2 - \frac{k_1}{B_2} - \frac{k_0}{B_2B_1}$$

Divider circuit 54 effectively divides the frequency of its input by a factor of $B_3$. Thus the output of divider circuit 54 which is impressed on input 1 of adder circuit 55, is a synchronized series of pulses at a frequency of $$\frac{k_2}{B_3}-\frac{k_1}{B_3B_2}-\frac{k_0}{B_3B_2B_1}$$

The second input of adder 55, being connected to input 4 of the circuit of Fig. 3, has impressed thereon a series if synchronized pulses at a frequency of $k_3$. Thus the output of adder 55 is a series of synchronized pulses at a frequency of $$k_3+\frac{k_2}{B_3}-\frac{k_1}{B_3B_2}-\frac{k_0}{B_3B_2B_1}$$

which will be found to be equal to $$\frac{a_0}{B_1B_2B_3}$$

(This will be shown algebraically hereinafter.) Thus it is seen that the output of the circuit of Fig. 3 is a low frequency output having the high stability of the high frequency, highly stable primary oscillator which renders an output of $a_0$.

Assuming the four inputs to have the following values $$k_0=B_1a_1-a_0$$
$$k_1=B_2a_2-a_1$$
$$k_2=a_2-B_3a_3$$
$$k_3=a_3$$

Algebraically, then $$a_0=B_1a_1-k_0$$
$$a_1=B_2a_2-k_1$$
$$a_2=B_3a_3+k_2$$
$$a_3=k_3$$

whereby $a_0$ may be reduced, step by step as follows $$a_0=B_1(B_2a_2-k_1)-k_0$$
$$a_0=B_1B_2(k_2+B_3k_3)-B_1k_1-k_0$$
$$a_0=B_1B_2B_3k_3+B_1B_2k_2-B_1k_1-k_0$$

$$\frac{a_0}{B_1B_2B_3}=k_3+\frac{k_2}{B_3}-\frac{k_1}{B_2B_3}-\frac{k_0}{B_1B_2B_3}$$

so that it appears that the output is equal to the primary frequency divided by a constant.

Fig. 4 discloses another alternative embodiment, in which another arrangement of divider, addition and subtraction circuits is provided. The circuit of Fig. 4 has four inputs which respectively receive a synchronized series of pulses at frequencies $k_4$, $k_5$, $k_6$ and $k_7$. Input 1 at a frequency of $k_4$ is impressed upon the input of divider circuit 56. Divider circuit 56 effectively divides the frequency of its input by a factor of $B_1$. Thus the output of divider circuit 56 which is impressed upon the first input of adder circuit 57 is a series of synchronized pulses at a frequency of $$\frac{k_4}{B_1}$$

Input 2 of the circuit of Fig. 4 is connected to the second input of adder circuit 57 and has impressed thereon a series of synchronized pulses at a frequency of $k_5$. Thus the output of adder circuit 57 which is impressed on the input of divider circuit 58 is a series of synchronized pulses at a frequency of $$k_5+\frac{k_4}{B_1}$$

Divider circuit 58 effectively divides the frequency of its input by a factor of $B_2$. Thus the output of divider circuit 58 which is impressed on input 1 of subtraction circuit 59 is a series of synchronized pulses at a frequency of $$\frac{k_5}{B_2}+\frac{k_4}{B_2B_1}$$

The second input of subtraction circuit 59 is connected to input 3 of the circuit of Fig. 4 and has impressed thereon a series of synchronized pulses at a frequency of $k_6$. Thus the output of subtraction circuit 59 which is impressed on the input of divider circuit 60 is a series of synchronized pulses at a frequency of $$k_6-\frac{k_5}{B_2}-\frac{k_4}{B_2B_1}$$

Divider circuit 60 effectively divides the frequency of its input by a factor of $B_3$. Thus the output of divider circuit 60 which is impressed on input 1 of subtraction circuit 61 is a series of synchronized pulses at a frequency of $$\frac{k_6}{B_3}-\frac{k_5}{B_3B_2}-\frac{k_4}{B_3B_2B_1}$$

The second input of subtraction circuit 60, being connected to input 4 of the circuit of Fig. 4, has impressed thereon a series of synchronized pulses at a frequency of $k_7$. Thus the output of subtraction circuit 61 is a series of synchronized pulses at a frequency of $$k_7-\frac{k_6}{B_3}+\frac{k_5}{B_3B_2}+\frac{k_4}{B_3B_2B_1}$$

This quantity is equal to $$\frac{a_0}{B_1B_2B_3}$$

(as will be shown algebraically hereinafter). Thus it is seen that the output of the circuit of Fig. 4 is a low frequency output having a high stability of the high frequency, highly stable primary oscillator which renders an output of $a_0$.

Assuming the four inputs to have the following values $$k_4=a_0-B_1a_1$$
$$k_5=a_1-B_2a_2$$
$$k_6=B_3a_3-a_2$$
$$k_7=a_3$$

From these values the following may be derived $$a_0=B_1a_1+k_4$$
$$a_1=B_2a_2+k_5$$
$$a_2=B_3a_3-k_6$$
$$a_3=k_7$$

and these may be combined as before to produce $$\frac{a_0}{B_1B_2B_3}=k_7-\frac{k_6}{B_3}+\frac{k_5}{B_2B_3}+\frac{k_4}{B_1B_2B_3}$$

from which it will again be seen that the final output will be the primary frequency divided by a constant.

Fig. 5 discloses an additional alternative embodiment in which it will be seen that another arrangement of divider, addition and subtraction circuits is provided. The circuitry of Fig. 5 has four inputs which respectively receive a series of synchronized pulses at frequencies $k_8$, $k_9$, $k_{10}$ and $k_{11}$. Input 1 at a frequency of $k_8$ is impressed on the input of divider circuit 62. Divider circuit 62 effectively divides the frequency of its input by a factor of $B_1$. Thus the output of divider circuit 62 which is impressed on the first input of adder 63 is a series of synchronized pulses at a frequency of $$\frac{k_8}{B_1}$$

Input 2 of the circuit of Fig. 5 is connected to the second input of adder circuit 63 and has impressed thereon a series of synchronized pulses at a frequency of $k_9$. Thus the output of adder circuit 63 which is impressed on the input of divider circuit 64 is a series of synchronized pulses at a frequency of $$k_9+\frac{k_8}{B_1}$$

Divider circuit 64 effectively divides the frequency of its input by a factor of $B_2$. Thus the output of divider circuit 64 which is impressed on input 1 of adder circuit 65 is a series of synchronized pulses at a frequency of $$\frac{k_9}{B_2}+\frac{k_8}{B_1B_2}$$

The second input of adder circuit 65 is connected to input 3 of the circuit of Fig. 5 and has impressed thereon a series of synchronized pulses at a frequency of $k_{10}$. Thus the output of adder circuit 65, which is impressed on the input of divider circuit 66, is a series of synchronized pulses at a frequency of $$k_{10}+\frac{k_9}{B_2}+\frac{k_8}{B_1B_2}$$

Divider circuit 66 effectively divides the frequency of its input by a factor of $B_3$. Thus the output of divider circuit 66 which is impressed on input 1 of subtraction circuit 67 is a series of synchronized pulses at a frequency of $$\frac{k_{10}}{B_3}+\frac{k_9}{B_2B_3}+\frac{k_8}{B_1B_2B_3}$$

The second input of subtraction circuit 66 has impressed thereon a series of synchronized pulses at a frequency of $k_{11}$. Thus the output of subtraction circuit 67 is a series of synchronized pulses at a frequency of $$k_{11}-\frac{k_{10}}{B_3}-\frac{k_9}{B_2B_3}-\frac{k_8}{B_1B_2B_3}$$

This quantity is equal to $$\frac{a_0}{B_1B_2B_3}$$

(as will be shown algebraically hereinafter). Thus it is seen that the output of the circuit of Fig. 5 is a low frequency output having a high stability of the high frequency, highly stable primary oscillator which renders an output of $a_0$.

Assuming the four inputs to have the following values $$k_8=B_1a_1-a_0$$
$$k_9=B_2a_2-a_1$$
$$k_{10}=B_3a_3-a_2$$
$$k_{11}=a_3$$

From these values the following may be derived $$a_0=B_1a_1+k_8$$
$$a_1=B_2a_2+k_9$$
$$a_2=B_3a_3+k_{10}$$
$$a_3=k_{11}$$

and these may be combined as before to produce $$\frac{a_0}{B_1B_2B_3}=k_{11}-\frac{k_{10}}{B_3}-\frac{k_9}{B_2B_3}-\frac{k_8}{B_1B_2B_3}$$

from which it will again be seen that the final output will be the primary frequency divided by a constant.

From the above four examples, a general rule may be derived. If the output of the mixers is invariably put in the form of $a_0-B_1a_1$, then this quantity may be considered as positive when $a_0$ is greater than $B_1a_1$. If then the following values are noted Fig. 1 $\quad \dfrac{a_0}{B_1B_2B_3}=\dfrac{d_0}{B_1B_2B_3}+\dfrac{d_1}{B_2B_3}+\dfrac{d_2}{B_3}+d_3$ Fig. 2 $\quad \dfrac{a_0}{2B_1B_2B_3}=-\dfrac{d_4}{2B_1B_2B_3}+\dfrac{d_5}{2B_2B_3}-\dfrac{d_6}{2B_3}+\dfrac{d_7}{2}$ Fig. 3 $\quad \dfrac{a_0}{B_1B_2B_3}=-\dfrac{k_0}{B_1B_2B_3}-\dfrac{k_1}{B_2B_3}+\dfrac{k_2}{B_3}+k_3$ Fig. 4 $\quad \dfrac{a_0}{B_1B_2B_3}=\dfrac{k_4}{B_1B_2B_3}+\dfrac{k_5}{B_2B_3}-\dfrac{k_6}{B_3}+k_7$ Fig. 5 $\quad \dfrac{a_0}{B_1B_2B_3}=\dfrac{k_8}{B_1B_2B_3}-\dfrac{k_9}{B_2B_3}-\dfrac{k_{10}}{B_3}+k_{11}$ It will be observed that where there is no change of sign from one term of the equation to the next an adder is employed, whereas when there is a change in sign a subtractor is employed.

From a very practical standpoint a subtractor, or as it will be called hereinafter, a deleting circuit, is a simpler and less costly component than an adder and hence in a preferred embodiment of the invention, shown in Fig. 6, the values of the various frequency sources have been chosen so that the outputs of the mixers will be first negative, then positive, then negative and finally positive so that a series of dividers and deleting circuits may be used and there will be no need to use the more complicated and expensive adder.

Figure 6:
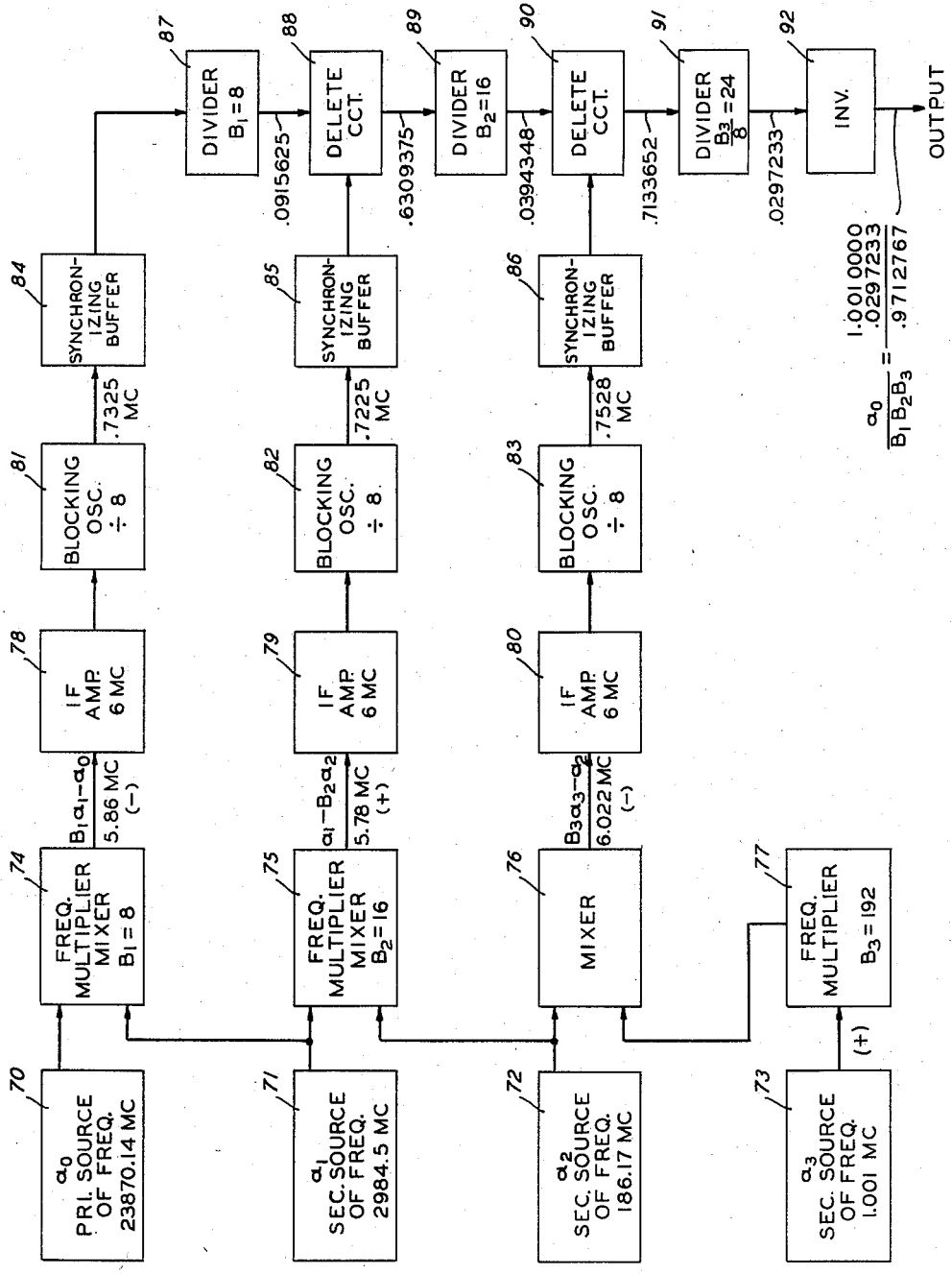
Fig. 6 is a block diagram showing the arrangement of the preferred embodiment of the invention, where a minimum of circuit components of a simpler nature are employed and particularly where one of the secondary sources of frequency is also employed as the prime source of synchronization.

Fig. 6.—The preferred embodiment

Fig. 6 shows in block diagram a system using a minimum of apparatus and employing the simplest type of components. The primary source of frequency $a_0$ is represented by the rectangle 70 and is marked, by way of example 23870.14 mc., the frequency of the molecular resonance of ammonia, now well known in the art. Such a source of frequency is considered conventional and its construction and method of operation will therefore not be described. The secondary sources of frequency $a_0=2984.5$ mc., $a_2=186.17$ mc., and $a_3=1.001$ mc., shown in rectangles 71, 72 and 73 respectively, are also conventional and are commercially available so that their construction and methods of operation will not be described.

The multiplier mixers 74 and 75, the mixer 76 and the frequency multiplier 77 are conventional and will not be specifically described. The following facts, however, should be particularly noted. The values chosen are such that the secondary frequency 2984.5 multiplied by a factor of 8 is greater than the primary frequency by 5.86 mc., and since $a_0-B_1a_1$ will be negative this 5.86 mc. is considered as a negative factor. The secondary frequency 186.17 multiplied by a factor of 16 is less than the secondary frequency 2984.5 by 5.78 mc. and since $a_1-B_2a_2$ will be positive this 5.78 mc. is considered as a positive factor. Since there is a change of sign between $a_0-B_1a_1$ and $a_1-B_2a_2$, the first arithmetical adjustment will be a subtraction and therefore the Delete circuit 88 will be employed. The secondary frequency 1.001 multiplied by a factor 192 is greater than the secondary frequency 186.17 by 6.022 mc. and since $a_2-B_3a_3$ will be negative this 6.022 mc. is considered to be a negative factor. Since there is a change of sign from the positive 5.78 mc. to the negative 6.022 mc., the second arithmetical adjustment will be a subtraction and therefore Delete circuit 90 will be employed. The secondary frequency $a_3$ shown in box 73 is 1.001 mc. is considered positive and since there is a change of sign from the negative 6.022 mc. to the positive 1.001 mc., the final arithmetical adjustment will be a subtraction. Since a subtraction of a decimal fraction from unity is the complement of the fraction, the inverter 92 is employed. It will be demonstrated hereinafter that the inverter 92 is fully equivalent to a delete circuit at this point since as the frequency of the source 73 varies, the count of the output of the divider 91 varies accordingly but the count of the blank spaces in this aperiodic train remains constant so that the output of the Inv. 92 remains constant even though the frequency of the synchronizing source 73 may vary.

It is to be particularly noted that the various values have been chosen so that the output of the multiplier mixers 74 and 75 and the mixer 76 are in the neighborhood of six megacycles so that these frequencies properly amplified by the conventional 6 mc. intermediate frequency amplifiers 78, 79 and 80 may then each be divided by the conventional blocking oscillator circuits 81, 82 and 83 respectively to provide outputs of something under one megacycle periodicity.

It may then be noted that four frequencies are provided for processing by the line of components 87 to 92 inclusive, namely the frequencies .7325 mc., .7225 mc., .75275 mc., and 1.001 mc. It may now be brought out that there are available a line of electronic components all designed to operate on a megacycle basis, particularly including the Havens Delay circuit disclosed in Reissue Patent 23,699, granted August 18, 1953, to Byron L. Havens. This is a device which within any one or more microsecond intervals may be triggered by one or more incoming pulses and which will produce and deliver at its output one or more outgoing pulses each delayed by one microsecond after the corresponding incoming pulse. This circuit depends on the provision of a source of frequency of one megacycle and the circuits operated thereby to provide synchronizing pulses and clamping potentials all of which are set forth in detail in the application of Charles R. Borders, Serial Number 444,251, filed July 19, 1954.

A feature of the present invention, particularly disclosed in this preferred embodiment of Fig. 6, is that $a_3$ the secondary source of frequency of 1.001 mc. is additionally employed as the source for the generation and supply of the clamp and sync. pulses required for the Havens Delay circuit used throughout the electronic components 84 through 92 inclusive.

Now it is to be noted that each of the frequencies delivered by the intermediate frequency amplifiers 78, 79 and 80 is periodic and that the output of the blocking oscillator divide by eight circuits 81, 82 and 83 will be the frequencies .7325 mc., .7225 mc. and .75275 mc. respectively. It will be noted that each of these frequencies is under one megacycle and hence the time interval for each cycle is greater than one microsecond. In order to encompass these 732,500 periodically occurring pulses into 1,000,000 one microsecond intervals, a synchronizing buffer 84 is employed. This is an electronic circuit which is rigidly controlled by the synchronizing and clamping pulses derived from the source 73 and which converts the periodic stream of pulses delivered thereto of a periodicity something less than a megacycle into an equal number of outgoing pulses in groups of pulses, the pulses within each of said groups being rigidly synchronized to a period of one (herein 1.001) megacycle. The output of the synchronizing buffer 84 therefore may not be spoken of as a frequency for it is actually aperiodic though it encompasses the same number of pulses as the input thereto.

The divide by eight blocking oscillator 81 is a conventional circuit and consists essentially of a chain of three blocking oscillators each of which contains a trigger tube and a pulse forming tube controlled by a timing circuit so adjusted that only every other one of the incoming pulses will produce an outgoing pulse. Such a device is described in the publication entitled "Waveforms" by Chance, Hughes, MacNickol, Sayre and Williams, Radiation Laboratory Series, volume 19, McGraw-Hill, 1949, section 16.8, particularly page 585. The component 81 will therefore very certainly and effectively divide the 5.86 mc. output of the amplifier 78 into a frequency of .7325 mc. and the synchronizing buffer 84 will convert this frequency into an aperiodic stream of pulses of the same count.

Figure 9:
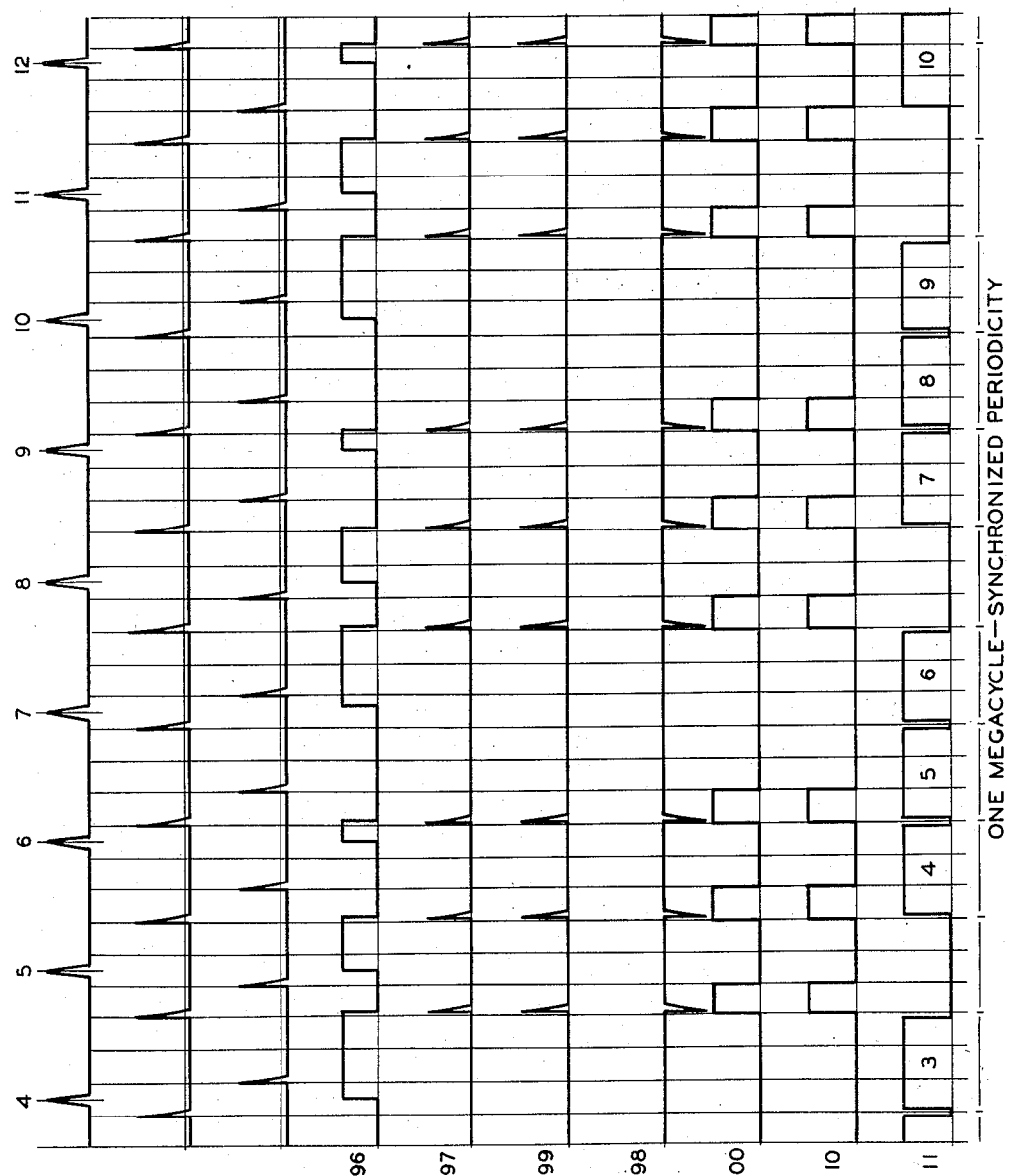
Fig. 9 is a time chart showing the operation of a synchronizing buffer in converting a 750,000 cycle frequency into a count of 750,000 pulses per second each compressed into a time interval of one microsecond.

The synchronizing buffer is shown in Fig. 7 in the form of a schematic circuit diagram, in Fig. 8 in the form of a logical circuit diagram and the sequence of its operations is set forth in the timing chart Fig. 9.

The operation of the synchronizing buffer may be shortly described as follows. The incoming pulses applied to the input are sharp pips the output of the blocking oscillator 81 (or 82 or 83). These are applied through the diode 93 to charge the condenser 94 and thus bring the potential of the suppressor grid of the tube 97 Up. The combination of the diodes 93 and 95 and the condenser 94 constitute a pulse stretcher shown in the logical diagram Fig. 8 as pulse stretcher 96. The Up condition of this component will be maintained until the clamp tube 98 is operated by the output of the blocking oscillator 99, when the condenser 94 will be discharged to bring the potential on the suppressor grid of tube 97 Down. The operation of the clamp tube 98 is directly responsive to the blocking oscillator 99 and this in turn is directly responsive to the pentode 97 which constitutes an And circuit. Therefore the suppressor grid of the tube 97 is held Up until the next synchronizing timing pulse is applied to the control grid thereof. When this happens tube 97 (And circuit 97 in the logical diagram Fig. 8) operates and triggers the blocking oscillator 99 and this in turn operates the clamp tube 98 to in turn terminate the operation of the pulse stretcher 96. At the same time the output of the blocking oscillator 99 delivers a pulse to the pulse stretcher 100 consisting of the two diodes 101 and 102 and the condenser 103. The condenser 103 is charged and the grid of the cathode follower tube 104 is brought Up and maintained Up until discharged by the inversion of a clamp timing pulse by the inverter 105 into a pulse for discharging the condenser 103 through the diode 102. During the Up condition of the cathode of tube 104 an Up condition is transmitted to the diode 106 forming one of the inputs to the And circuit forming the input to the standard one microsecond Delay circuit 110 consisting of the tubes 108 and 109. When a synchronizing pulse is transmitted to the diode 107 this Delay circuit operates and transmits a one microsecond outgoing pulse over its output 111 during the succeeding microsecond interval.

In Fig. 9 the various peaks of the incoming pulses have been numbered and the various output pulses have been correspondingly numbered so that from a quick visual inspection of the chart the final disposition of each incoming pulse will be apparent.

With this description of the operation of the synchronizing buffer it will be at once apparent how the periodic stream of pulses marked input in Fig. 9 is converted into the aperiodic succession of pulses marked output 111 in this timing chart. For convenience the input pulses have been drawn as though exactly at a frequency of 750 kilocycles while the remaining part of the chart is placed on a microsecond basis. It will thus appear that the time intervals of the input are compressed to microsecond intervals and the smaller number of input pulses on the input are regrouped so as to form an aperiodic succession of pulses having a shorter periodicity. The synchronizing buffer is therefore an electronic circuit which is rigidly controlled by the synchronizing and clamping pulses derived from a one megacycle source of frequency and which converts a periodic stream of pulses of a periodicity something less than a megacycle into an equal number of outgoing pulses in groups of pulses, the pulses within each of said groups being rigidly synchronized to a periodicity of one megacycle.

Depending on the ratio of the periodicity of the input to one megacycle these groups of outgoing pulses will be of unequal number in some cases and of equal number in other cases. By way of example, if the input is precisely of seven hundred and fifty kilocycles, the outgoing pulses will be in recurrent groups of three in each group of four microseconds, but if there is any deviation from this ratio the pattern will be altered. Nevertheless, in an appreciable period the number of one microsecond outgoing pulses will average the number of incoming pulses. Thus the synchronizing buffer 84 provides an output rigidly synchronized from the source 73 so that the pulse incoming to the divider 87 and passing through the devices 88 to 92 inclusive will be properly timed to operate with the delay circuits therein.

The circuit next in line after the synchronizing buffer 84 is an aperiodic divide by eight circuit 87. As indicated in Fig. 13, a divide by eight circuit is made up of a pair of divide by two circuits, a pulse shaping delay circuit, another divide by two circuit and a final pulse shaping Delay circuit in seriatim. The Delay circuit is a standard Havens Delay, shown in the Reissue Patent 23,699 hereinbefore cited. The divide by two circuit is shown in the form of a logical diagram in Fig. 10 and is a device which will produce one outgoing impulse for each two incoming impulses. The incoming pulses feed into an And circuit 112 and an Or circuit 113. Assuming the first pulse to be the first of a series then there will be no coincidence produced in the And circuit 112 and consequently the output of the Inv. 114 will be Up and coincidence will be produced in the And circuit 115 from this inverter and from the Or circuit 113. Therefore the Delay circuit 116 will be operated so that in the following microsecond a pulse will be transmitted thereby to both the And circuit 112 and the Or circuit 113. If in this next microsecond another pulse comes in over the input, the And circuit 112 will transmit one outgoing pulse and will operate the Inv. 114 to discharge the latch consisting of the Or circuit 113, the And circuit 115 and the Delay 116 whereby in the third period the circuit will be found in the starting condition. If in the second (and any number of following) intervals no incoming pulse appears, then the latch will remain operated until another incoming pulse does appear whereupon the sequence of operations will be resumed. This circuit is known as a synchronized aperiodic divider because firstly the Delay operates under the influence of the synchronizing pulse and the clamping potential derived from the primary source of synchronizing frequency and secondly because of the latch provided in its circuitry it will produce one outgoing pulse for each two incoming pulses no matter how irregularly the incoming pulses are scattered.

Figure 12:
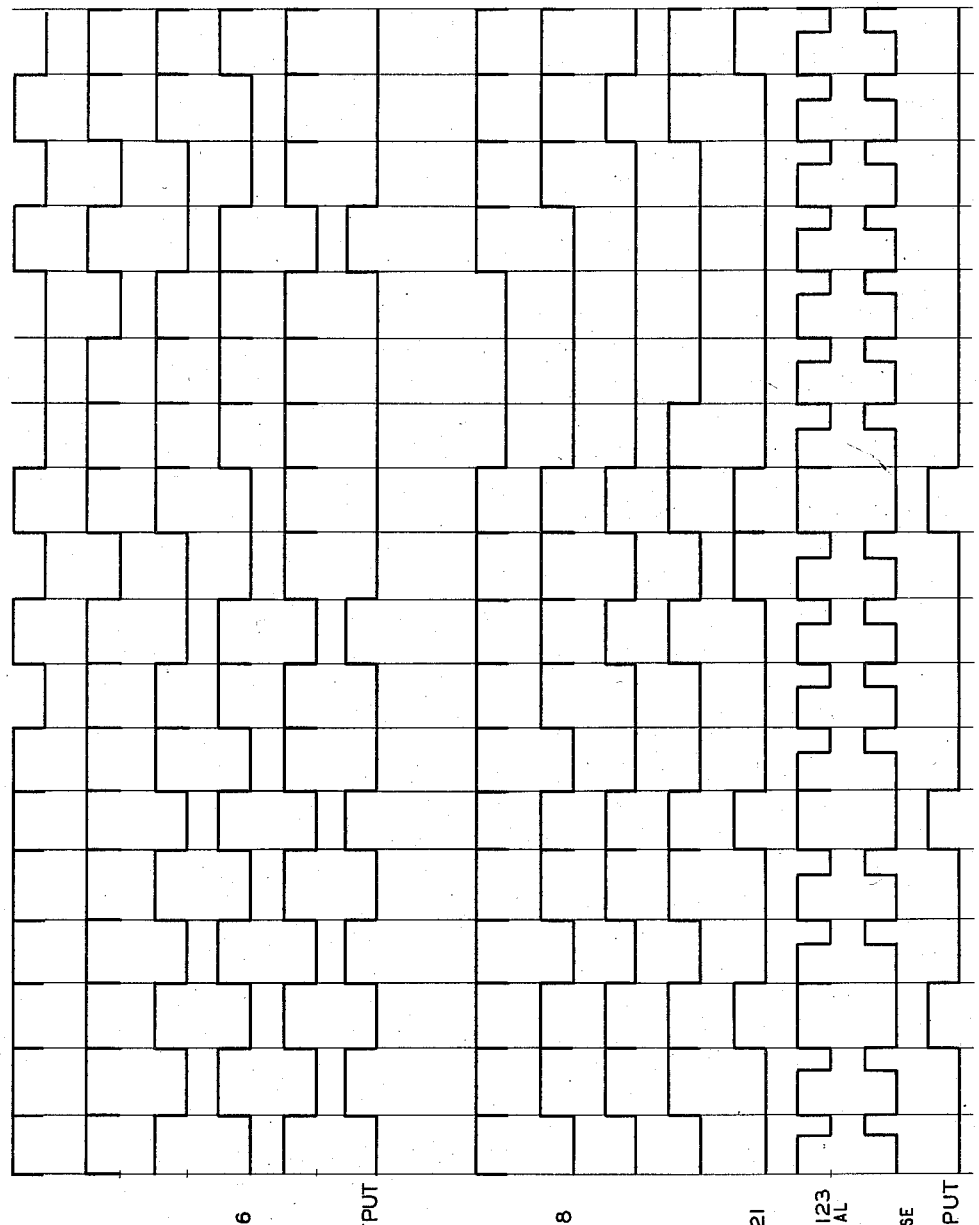
Fig. 12 is a time chart showing an aperiodic stream of incoming pulses and the disposition of such pulses by a divide by two and by a divide by three circuit.

The detailed operation of such a divide by two circuit may be followed in the time chart of Fig. 12 where a very irregular stream of incoming pulses is shown. It may also be found in three instances in the time chart of Fig. 16 where the operations of a divide by eight combination are shown.

The divide by three circuit shown in Fig. 11 is somewhat more complicated. This uses two latches, the first made up of Or circuit 117 and Delay 118 and the second made up of Or circuit 120 and Delay 121. Both Delay circuits are under control of a synchronizing pulse circuit coming from the output of the Inv. 122 which in turn is controlled by the Or circuit 123, which has two inputs, one connected to the synchronizing signal wire (the inverse of the synchronizing pulse circuit) and another from the output of the complete circuit. On a first incoming pulse the first latch is triggered, on a second incoming pulse the second latch is triggered and on a third incoming pulse, when an outgoing pulse is produced the sync. signal is blanketed so that the Inv. is operated for the complete length of the timing interval and therefore the two Delay circuits are deprived of their sync. pulse and therefore are released. The complete sequence of operations of this circuit may be followed from the timing chart Fig. 12 where the response of this divide by three circuit to the same irregular series of incoming pulses used to show the operation of the divide by two circuit is shown.

As indicated in Fig. 15, the divide by three circuit is employed as a component of the divide by twenty four circuit, also indicated in Fig. 6 as the divider 91.

Returning now to Fig. 6, it will be seen that after the aperiodic output of the synchronizing buffer 84, containing, by way of example, 732,500 square shaped pulses is divided by eight by the divider circuit 87 an average aperiodic output of 91,562.5 square shaped pulses per second is produced. This is entered as input 2 into the Delete circuit 88, the output of 722,500 pulses from synchronizing buffer 85 being entered as input 1 so that the difference or 630,937.5 output pulses is derived.

The Delete circuit essentially consists of a means for deriving a remainder from which a pulse corresponding to each missing pulse in the minuend, and a pulse corresponding to each pulse of the subtrahend is deleted. From the time chart Fig. 19 it will appear that each missing pulse of the minuend is reflected by a deletion of a pulse from the remainder one microsecond later. It will also appear that each pulse of the subtrahend will be reflected by the deletion of a pulse from the remainder two microsecond intervals later except that where such deletion would coincide with a deletion caused by a missing minuend pulse, in which case the condition is stored in a latch and the deletion from the remainder occurs three microsecond intervals later. Thus the minuend missing pulses occurring in the 1st, 5th, 9th, 13th, 17th microsecond intervals will be reflected as missing pulses in the remainder in the 2nd, 6th, 10th, 14th, and 18th microsecond intervals respectively. Ordinarily the subtrahend pulses occurring in the 1st, 12th, 22nd, 33rd, 44th and 55th microsecond intervals would be reflected as missing pulses in the remainder in the 3rd, 14th, 24th, 35th, 46th and 57th microsecond intervals. However, it is to be noted that such deletions occurring in the 14th and 45th intervals would interfere with deletions caused by missing pulses from the minuend and hence these are delayed for one microsecond interval each. The deletions reflecting the subtrahend pulses therefore occur in the 3rd, 15th, 25th, 35th, 47th and 57th microsecond intervals.

This pattern of operation is pictured in Fig. 20 where the minuend, subtrahend and remainder graphs from Fig. 19 are rearranged in order and arrows are drawn from the missing pulses of the minuend to show the corresponding deletions from the remainder and similar arrows are drawn from the subtrahend pulses to indicate the corresponding deletions from the remainder. Those deletions stemming from the subtrahend which would interfere with deletions stemming from the minuend are indicated by an arrow bent to show a carry over to a later interval.

Looking now at the circuit diagram Fig. 17 and the logical diagram Fig. 18, let us assume first a continuous and unbroken succession of pulses applied to input 1, the minuend and a complete absence of any pulses applied to input 2, the subtrahend. According to the cogitations regarding Fig. 20 this should produce a continuous and unbroken output, the remainder. No pulses on input 2 will produce no operation of the Or circuit 125. A continuous input into the minuend will continuously operate the inverter 126 therefore holding the output thereof Down whereby the And circuit 127 will be continuously denied coincidence. Therefore there will be no output from Or circuit 125 and the Delay 128 will not be triggered. The output of the delay 128 works into the Inv. 129 and hence its output will be continuously Up so that the And circuit having an Up condition continuously applied to its two inputs will continuously trigger the Delay 131 whereby the output or remainder will be a continuous and unbroken series of output pulses.

Let us now assume a single break in the chain of minuend pulses. This will produce a single Down pulse transmitted by the And circuit 130 and one microsecond later a single deletion from the chain of outgoing pulses from the Delay 131.

Let us now assume a single incoming pulse over the subtrahend input 2. This will produce a single operation of the Or circuit 125, a triggering of the Delay circuit 128 and operation of the Inv. 129 and consequently a single Down pulse from the And circuit 130 resulting in a single deletion from the remainder two microseconds (Delay 128 and Delay 131) after the incoming subtrahend pulse.

Let us lastly assume a single subtrahend pulse followed one microsecond thereafter by a single deletion from the minuend. The subtrahend pulse through the Or circuit 125 will trigger the Delay 128 so that one microsecond thereafter the Inv. 129 will be operated and both inputs to And circuit 130 will go Down thereby deleting a pulse one microsecond after the missing pulse in the minuend from the remainder. However, at this time the minuend missing pulse will fail to operate the Inv. 126 so that its output goes Up to energize the And circuit 127 one microsecond after the subtrahend pulse exactly while the Delay 128 is delivering its output pulse. Therefore the latch comprising the Or circuit 125, the Delay 128 and And circuit 127 is locked in for one microsecond and the Or circuit 125 is brought Up an additional microsecond whereby the Delay is again triggered. This results in a second operation of the Inv. 129 and a second release of the And circuit 130 so that another deletion is made from the stream of out pulses, this time three microseconds after the subtrahend pulse.

It is believed that this backward approach will be a sufficient explanation of the operation of the Delete circuit. However, certain elements of the schematic circuit diagram should be understood. The diode 132, diode 133 and the pull down resistor 134 connected to a negative source of potential constitute the Or circuit 125. Tube 135 is a C. F. (cathode follower) which triggers the standard Delay circuit through its diode 136 and whose output connected to the cathode of its tube 138 extends to diode 139. Diodes 139 and 140 constitute the And circuit 127 and this feeds into diode 133 one of the inputs of Or circuit 125. The minuend wire operates tube 141 which with its cathode follower tube 142 constitutes the Inv. 126. The output of Delay 128 also feeds into tube 143 which with its cathode follower tube 144 constitutes the Inv. 129. The output of the inverter 129 extends to the diode 145 which with diode 146 connected to the minuend constitutes the And circuit 130. This feeds the cathode follower tube 147 which in turn operates to trigger the Delay 131.

Various potential values are noted particularly on the schematic circuit diagram Fig. 17 which will be understood to be by way of example.

By way of conclusion it need now only be noted that the output of the last Delete circuit 90 is divided by 24 and then inverted to constitute the output of the device. The multipliers $B_1=8$, $B_2=16$, and $B_3=192$ are the same as the dividers. Since a blocking oscillator divide by eight circuit 81, 82, or 83 is used the last division is by 24, that is, one eighth of the $B_3$ value of 192.

The embodiment of the invention shown in Fig. 6 has been marked with a large number of specific values which again will be understood to be by way of example only. Needless to say it will be recognized that these, what might be termed odd values, stem from the use of the super high frequency 23,870.14 megacycles, the molecular resonance frequency of $NH_3$ which is believed to be constant and a value which may be relied upon as an invariant source of super high frequency.

In order to demonstrate the equivalence of an inverter to a Delete circuit in a system wherein the secondary oscillator acts also as synchronizing control, let us assume a single stage apparatus consisting of the last stage of the device of Fig. 6.

Here the oscillator $a_2$ will constitute the high frequency source and the oscillator $a_3$ will constitute the low frequency source and at the time will act as the source of synchronizing current. Through the multiplier 77 (factor 192) and the mixer 76 the beat frequency derived is $192.192-186.17=6.022$ which is within the capabilities of the 6 m. c. intermediate frequency amplifier 80. This frequency is then passed through the blocking oscillator divide by eight circuit 83 and comes out as a train of spikes having a frequency of $6.022/8=.75275$ mc. This last frequency is then passed through the synchronizing buffer 86 where it comes out as a total of 1,001,000 equal to 752,750 pulses and 248,250 blanks. The Delete circuit 90 is not used in this particular example because we are assuming a single stage and no quotient, as from the divide circuit 89, enters the problem. The aperiodic output of the synchronizing buffer 86 is next passed through the divide by 24 circuit so that the 752,750 pulses are then reduced to 31,364.58330 pulses and a complement of 969,635.41660 blanks. When this train of pulses passes through the inverter 92 the pulses become blanks and the blanks become pulses whereby the final output is an aperiodic train of 969,635.4166 pulses equal to $a_2/192$, or 186.17 mc./192.

It will be at one apparent that if a Delete circuit had been used in place of the Inv. 92 that such circuit would have had two inputs a minuend input directly from the source $a_3$ of 1.001 mc. and a subtrahend input from the divider 91 of .0313645833 mc. and that the remainder transmitted over the output wire would have been .96963554166 mc.

Put into the more erudite language of mathematics we may consider T to be an arbitrary period of $n$ equal length intervals $t$, some of which are occupied by pulses and some of which are blank. If $x$ equals the number of pulses per unit of time and $y$ equals the number of interspersed blanks per unit of time, then $$n \text{ or } \frac{T}{t} \text{ equals } xT+yT$$

In such a system the function of an inverter may be defined by the relation $$yT=\frac{T}{t}-xT \qquad (1)$$

since upon inversion the pulses are changed to blanks and the blanks are changed to pulses. Equation 1 may be reduced by algebraic elimination of T, to $$y=\frac{1}{t}-x \qquad (2)$$

Now in a system such as that shown in Fig. 6, where $a_3$ determines the pulse interval $$a_3=\frac{1}{t}=d_3 \qquad (3)$$

and $x$ would correspond to the subtrahend of a Delete circuit, that is the output of the last divider 91 and this would be $$\frac{d_3}{B_3}-\frac{d_1}{B_2B_3}+\frac{d_0}{B_1B_2B_3} \qquad (4)$$

whereby $$y=d_3-\frac{d_2}{B_3}+\frac{d_1}{B_2B_3}-\frac{d_0}{B_1B_2B_3} \qquad (5)$$

which we have seen hereinbefore to be the same as $$y=\frac{a_0}{B_1B_2B_3} \qquad (6)$$

so that it appears that in such a system an inverter is fully equivalent to a deleter.

What is claimed is:

1. Electronic apparatus for producing a train of pulses, including a primary high frequency oscillator, a secondary oscillator having an output frequency less in value than the frequency of said primary oscillator, means for multiplying the frequency of said secondary oscillator by a given factor to produce a product frequency, means for combining the product frequency with the high frequency of said primary oscillator to produce a difference or beat frequency, means for dividing said difference or beat frequency by said given factor to produce a quotient frequency and means for algebraically adding said quotient frequency to the frequency of said secondary oscillator to effectively divide the frequency of said primary oscillator by said given multiplying factor.

2. Electronic apparatus for producing a train of pulses including a primary super high frequency oscillator, a plurality of secondary oscillators respectively rendering outputs at frequencies less than said primary oscillator, each said secondary oscillator rendering a frequency less than the next said secondary oscillator respectively in turn, means for multiplying each said secondary frequency by a given multiplying factor, means for combining the product of said multiplying means with said next higher frequency to produce a beat output, means for dividing each said beat output by the same multiplying factor used in producing it for producing a quotient frequency and means for arithmetically combining each said quotient frequency with the beat output next lower in order to produce a final output equal to the primary super high frequency divided by the product of said multiplying factors.

3. Electronic apparatus for producing a train of pulses, including a primary oscillator having an output of a frequency $a_0$, a plurality of secondary oscillators having output frequencies $a_1$, $a_2$ and $a_3$ respectively, means for combining said frequencies with multiplying factors $B_1$, $B_2$ and $B_3$, the values of said frequencies and said multiplying factors being such that $(a_0-B_1a_1)$, $(a_1-B_2a_2)$, $(a_2-B_3a_3)$ and $a_3$ are substantially in the same range, the multiplying factors $B_1$, $B_2$ and $B_3$ being progressively greater in value, a first means for dividing $(a_0-B_1a_1)$ by the factor $B_1$ to produce a quotient frequency, a second means for arithmetically combining the said quotient frequency of said first operation with the output $(a_1-B_2a_2)$, a third means for dividing the result of said second operation by the factor $B_2$, a fourth means for arithmetically combining the quotient of said third operation with the output $(a_2-B_3a_3)$, a fifth means for dividing the result of said fourth operation by the factor $B_3$ to produce a quotient frequency and a sixth means for arithmetically combining the said quotient frequency of said fifth operation with the output $a_3$ for deriving a final output of the value $a_0/B_1B_2B_3$.

4. Electronic apparatus for producing a train of pulses, including a primary oscillator having an output frequency, $a_0$, a plurality of secondary oscillators having output frequencies $a_1$, $a_2$ and $a_3$ respectively, means for combining said frequencies with multiplying factors $B_1$, $B_2$ and $B_3$, the values of said frequencies and said multiplying factors being such that $(B_1a_1-a_0)$, $(a_1-B_2a_2)$, $(B_3a_3-a_2)$ and $a_3$ are substantially in the same range, the multiplying factors $B_1$, $B_2$ and $B_3$ being progressively greater in value, a first means for dividing the quantity $B_1a_1-a_0$ by the factor $B_1$, a second means for deleting the quotient of said first operation from the quantity $(a_1-B_2a_2)$, a third means for dividing the remainder of said second operation by the factor $B_2$, a fourth means for deleting the quotient of said third operation from the quantity $(B_3a_3-a_2)$, a fifth means for dividing the remainder of said fourth operation by the factor $B_3$ and a sixth means for deleting the quotient of said fifth operation from the quantity $a_3$ for deriving a final output of the value $a_0/B_1B_2B_3$.

5. Electronic apparatus for producing a train of pulses, including a primary oscillator having an output frequency $a_0$, a plurality of secondary oscillators having output frequencies $a_1$, $a_2$ and $a_3$ respectively, means for combining said frequencies with multiplying factors $B_1$, $B_2$ and $B_3$ and a dividing factor $B_4$, the value of said frequencies and said factors being such that $$(B_1a_1-a_0)/B_4, (a_1-B_2a_2)/B_4, (B_3a_3-a_2)/B_4$$

and $a_3$ are substantially equal, a first means for dividing the quantity $(B_1a_1-a_0)/B_4$ by the factor $B_1$, a second means for deleting the quotient of said first operation from the quantity $(a_1-B_2a_2)/B_4$, a third means for dividing the remainder of said second operation by the factor $B_2$, a fourth means for deleting the remainder of said third operation from the quantity $(B_3a_3-a_2)/B_4$, a fifth means for dividing the remainder of said fourth operation by the factor $a_3/B_4$, and a sixth means for deleting the quotient of said fifth operation from the quantity $a_3$ for deriving a final output of the value $a_0/B_1B_2B_3$.

6. Electronic apparatus for producing an aperiodic train of pulses, including a primary oscillator having an output frequency $a_0$ and a secondary oscillator having an output frequency $a_1$, means for multiplying the output of said secondary oscillator by the factor $B_1$, means for mixing the frequencies $a_0$ and $B_1a_1$, to produce the beat frequency $(B_1a_1-a_0)$, means for dividing said beat frequency by the factor $B_1$, a source of synchronizing frequency having a value exceeding the value $(B_1a_1-a_0)/B_1$, a synchronizing buffer controlled by said source of synchronizing frequency for converting said frequency $(B_1a_1-a_0)/B_1$ into an aperiodic train of pulses having an average number of pulses per time unit equal to the frequency $(B_1a_1-a_0)/B_1$, a second synchronizing buffer for converting the frequency $a_1$ into an aperiodic train of pulses having an average number of pulses per time unit equal to the frequency $a_1$, and means for deleting the quotient of said dividing operation from the output of said second synchronizing buffer to produce an aperiodic train of pulses having a value equal to $a_0/B_1$.

7. Electronic apparatus for converting a periodic train of pulses of a given frequency into an aperiodic train of pulses spaced at a periodicity slightly greater than said frequency, comprising a source of synchronizing current for supplying a train of pulses having a frequency equal to said periodicity, a pulse stretcher for stretching each pulse of said train of periodic pulses, means controlled by said synchronizing current for terminating each of said stretched pulses and means for translating coincident stretched pulses and pulses of said synchronizing current into outgoing pulses to form said aperiodic train of pulses.

8. A synchronizing buffer consisting of electronic apparatus for converting a periodic train of pulses of a given frequency into an aperiodic train of pulses spaced at a periodicity slightly greater than said frequency, comprising a source of synchronizing current for supplying a train of pulses having a frequency equal to said periodicity, means for deriving from said synchronizing current a first train of timing pulses and a second train of timing pulses out of phase with said first train of timing pulses, a pulse stretcher for stretching each pulse of said train of periodic pulses, means controlled by said pulses of said first train of timing pulses for terminating each of said stretched pulses, a second pulse stretcher responsive to the means for terminating each said stretched pulse for creating a second stretched pulse, means controlled by said pulses of said second train of timing pulses for terminating each of said second stretched pulses, and means responsive to each of said second stretched pulses for creating an outgoing pulse.

9. A synchronizing buffer consisting of electronic apparatus for converting a periodic train of pulses of a given frequency into an aperiodic train of pulses spaced at a periodicity slightly greater than said frequency, comprising a source of synchronizing current for supplying a train of pulses having a frequency equal to said periodicity, means for deriving from said synchronizing current a first train of timing pulses and a second train of timing pulses out of phase with said first train of timing pulses, a pulse stretcher for stretching each pulse of said train of periodic pulses, means controlled by said pulses of said first train of timing pulses for terminating each of said stretched pulses, a second pulse stretcher responsive to the means for terminating each said stretched pulse for creating a second stretched pulse, means controlled by said pulses of said second train of timing pulses for terminating each of said second stretched pulses and a delay circuit responsive to an incoming pulse within a period measured by the periodicity of said synchronizing current for creating and transmitting an outgoing pulse extending over the next succeeding period, said delay circuit being responsive to said second stretched pulses.

10. Electronic apparatus for dividing an aperiodic train of pulses by the factor two comprising an input wire over which said pulses are transmitted into said apparatus, a coincidence circuit having one input connected to said input wire and a latch consisting of a circuit which may be triggered to record and maintain an input signal connected to said input wire, said latch being responsive to a first pulse incoming over said input wire, said latch operating thereafter to transmit a pulse to a second input of said coincidence circuit in each succeeding pulse interval and means responsive to an outgoing pulse from said coincidence circuit for releasing said latch, the outgoing terminal of said coincidence circuit constituting an output terminal for said apparatus.

11. Electronic apparatus for dividing an aperiodic train of pulses by the factor three comprising an input wire over which said pulses are transmitted into said apparatus, a coincidence circuit having one input terminal connected to said input wire, a first latch consisting of a circuit which may be triggered to record and maintain an input signal connected to said input wire, said first latch being responsive to a first pulse incoming over said input wire, said latch operating thereafter to transmit a pulse over an output terminal during each succeeding pulse interval, a second coincidence circuit having one input terminal connected to said input wire and a second input terminal connected to the output terminal of said first latch, a second latch connected to said second coincidence circuit and responsive to a second pulse of said train, said second latch operating thereafter to transmit a pulse over an output terminal during each succeeding pulse interval, said second latch output terminal being connected to a second input terminal of said first coincidence circuit, an output terminal of said first coincidence circuit constituting an output terminal for said apparatus, and means controlled thereby for releasing said latches.

12. Electronic apparatus for subtracting the pulses of an aperiodic train of a smaller number of pulses hereinafter known as subtrahend pulses from the pulses of an aperiodic train of a larger number of pulses, hereinafter known as minuend pulses, comprising means for producing a train of outgoing pulses, hereinafter known as remainder pulses, said remainder pulses corresponding in time spacing to said minuend pulses, means responsive to subtrahend pulses for deleting one pulse from said train of remainder pulses for each subtrahend pulse, and means for delaying the deletion of a said remainder pulse for a subtrahend pulse responsive to the absence of a minuend pulse within the same time spacing interval.

13. Electronic apparatus for producing an aperiodic train of pulses, including a high frequency oscillator and a low frequency oscillator, a means to multiply the frequency of said low frequency oscillator by a given factor, means to mix said multiplied low frequency with said high frequency to obtain a beat frequency therefrom, a synchronizing buffer controlled by said low frequency, means for passing said beat frequency through said synchronizing buffer to derive an aperiodic train of pulses containing pulses totaling said low frequency count and pulse length spaces scattered therebetween means to divide the output of said synchronizing buffer by said given factor to product a quotient train of pulses and an inverter for converting the said spaces in said quotient train of pulses into an aperiodic train of pulses equal in count to said high frequency divided by said given factor.

14. Electronic apparatus for producing an aperiodic train of pulses, including a primary super high frequency oscillator, and a plurality of secondary oscillators arranged in a cascade of stages, means in each said stage to multiply the frequency of a next lower value oscillator by a given constant, means to mix said multiplied frequency with a next higher frequency to obtain a beat frequency to constitute a stage output, means to divide said stage output by said given constant to obtain a quotient and means to delete said quotient from the stage output of the next in line stage, characterized in this, that the stage output of a last stage is the output of the last in line of said secondary oscillators and a simple inverter circuit is substituted for the said delete means of said last stage.

15. Electronic apparatus for producing an aperiodic train of pulses, including a high frequency oscillator and a low frequency oscillator, a means to multiply the frequency of said low frequency oscillator by a given factor, means to mix said multiplied low frequency with said high frequency to obtain a beat frequency, a synchronizing buffer controlled by said low frequency source, means for passing said beat frequency through said synchronizing buffer to derive an aperiodic train of pulses containing pulses totaling the count of said low frequency and pulse length spaces scattered therebetween, means to divide the output of said synchronizing buffer by said given factor and means for thereafter deriving an aperiodic train of pulses equal to the count of said low frequency minus the number of outgoing pulses transmitted by said divider.

16. Electronic apparatus for producing an aperiodic train of pulses including a plurality of oscillators each having a different output frequency, means for multiplying a frequency by a given factor and mixing it with the frequency next higher in value to obtain a beat frequency, a synchronizing buffer for changing each beat frequency into an aperiodic train of pulses, said synchronizing buffers being under control of said oscillator having the lowest frequency and means for thereafter algebraically combining said aperiodic trains of pulses to derive a final aperiodic train of pulses having an invariant functional relation to only said highest frequency.

17. Electronic apparatus for converting an unbroken train of successive pulses in a given time into an aperiodic train of a greater number of intervals containing the same number of pulses and a plurality of blanks each of a length equal to the length of a pulse interspersed therebetween, including a given frequency source of pulses and a higher frequency synchronizing source, any variation in the frequency of said synchronizing source being reflected in a corresponding variation in the number of said blanks interspersed in said train of a constant number of pulses, means for deriving synchronizing and clamping signals from said synchronizing source and coincidence circuits responsive to said pulses and said synchronizing pulses for controlling the creation of outgoing pulses of an aperiodic train.

18. Electronic apparatus for producing a train of pulses, including a primary source of alternating current of a given frequency and a secondary source of alternating current having a frequency less than said given frequency, means for multiplying the frequency of said secondary source by a given factor, means for combining said multiplied frequency and said given frequency to produce a beat frequency, means for dividing said beat frequency by said given factor and means for algebraically combining said divided beat frequency with said secondary source frequency to produce a frequency equal to said primary source frequency divided by said given factor.

19. Electronic apparatus for producing a train of pulses, including a primary source of alternating current of a given frequency and a plurality of secondary sources of alternating current each of a lower frequency than said primary source and each of a progressively lower frequency than another of said secondary sources, each said source and the next lower said secondary source being associated in a stage in which the lower frequency thereof is passed through a means to multiply the said lower frequency by a given factor, said factors for said different stages being different, means for combining the higher frequency of a said stage with the said multiplied lower frequency to derive a stage beat frequency, means for algebraically combining said stage beat frequency with a stage output from a preceding stage to produce a stage output and means to divide each said stage output by the said stage multiplying factor to produce in said last stage output a frequency equal to the frequency of said primary source divided by the product of all said stage multiplying factors.

References Cited in the file of this patent

UNITED STATES PATENTS

| | | |
|---|---|---|
| 2,186,544 | Koch | Jan. 9, 1940 |
| 2,593,452 | Hoeppner | Apr. 22, 1952 |
| 2,594,092 | Taylor | Apr. 22, 1952 |
| 2,594,276 | Barker et al. | Apr. 29, 1952 |
| 2,620,440 | Paker et al. | Dec. 2, 1952 |

FOREIGN PATENTS

| | | |
|---|---|---|
| 119,004 | Australia | Sept. 25, 1944 |
| 578,151 | Great Britain | June 18, 1946 |
| 137,151 | Australia | Oct. 2, 1947 |
| 1,052,685 | France | Jan. 26, 1954 |